(12) United States Patent
Gao et al.

(10) Patent No.: US 12,233,847 B2
(45) Date of Patent: Feb. 25, 2025

(54) SYSTEM AND METHOD OF VEHICLE POWERTRAIN CONTROL

(71) Applicant: UT-Battelle, LLC, Oak Ridge, TN (US)

(72) Inventors: Zhiming Gao, Knoxville, TN (US); Timothy J. LaClair, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 709 days.

(21) Appl. No.: 17/104,067

(22) Filed: Nov. 25, 2020

(65) Prior Publication Data

US 2021/0155226 A1    May 27, 2021

Related U.S. Application Data

(60) Provisional application No. 62/939,783, filed on Nov. 25, 2019.

(51) Int. Cl.
| | |
|---|---|
| *B60W 20/40* | (2016.01) |
| *G01C 21/34* | (2006.01) |
| *G06F 16/90* | (2019.01) |
| *G06F 16/9035* | (2019.01) |
| *H02J 7/32* | (2006.01) |

(52) U.S. Cl.
CPC ......... *B60W 20/40* (2013.01); *G01C 21/3492* (2013.01); *G06F 16/9035* (2019.01); *H02J 7/32* (2013.01); *B60W 2510/085* (2013.01)

(58) Field of Classification Search
CPC .......... B60W 20/40; B60W 2510/085; B60W 10/08; B60W 10/06; B60W 20/10; G01C 21/3492; G06F 16/9035; H02J 7/32; H02J 7/00712; H02J 7/1446; H02J 7/1492; H02J 2310/48; B60K 2006/4825; B60K 6/48; B60L 2200/01; B60L 2240/12; B60L 2240/463; B60L 1/00; B60L 50/61; B60L 58/13; Y02T 10/62; Y02T 10/70; Y02T 90/14

See application file for complete search history.

(56) References Cited

U.S. PATENT DOCUMENTS

| | | | |
|---|---|---|---|
| 6,110,066 A | 8/2000 | Nedungadi et al. | |
| 6,549,832 B2 * | 4/2003 | Nakasako | B60K 6/48 |
| | | | 903/917 |
| 2002/0055810 A1* | 5/2002 | Nakasako | B60W 10/06 |
| | | | 903/917 |
| 2011/0202223 A1* | 8/2011 | Nefcy | B60W 20/11 |
| | | | 903/903 |

(Continued)

OTHER PUBLICATIONS

Gao, Z. et al., "Simulations of the fuel economy and emissions of hybrid transit buses over planned local routes", SAE International Journal of Commercial Vehicles, vol. 7, Issue 1, May 2014, pp. 216-237.

(Continued)

*Primary Examiner* — Tyler J Lee
(74) *Attorney, Agent, or Firm* — Warner Norcross + Judd LLP

(57) ABSTRACT

An efficiency-based powertrain control system and method to provide real-time optimization of powertrain efficiency for a plug-in hybrid electric vehicle (PHEV).

19 Claims, 17 Drawing Sheets

(56) References Cited

U.S. PATENT DOCUMENTS

| | | | |
|---|---|---|---|
| 2012/0232731 A1* | 9/2012 | Sujan | B60W 50/0097 |
| | | | 701/22 |
| 2020/0070679 A1* | 3/2020 | Wang | B60L 58/21 |
| 2020/0377072 A1* | 12/2020 | Kim | B60K 6/485 |

OTHER PUBLICATIONS

Cikanek, S.R. et al., "Parallel hybrid electric vehicle dynamic model and powertrain contro," In Proceedings of the 1997 American Control Conference (Cat. No. 97CH36041), IEEE, vol. 1, Jun. 1997, pp. 684-688.

* cited by examiner

DDC/CDC ACCORDING TO ONE EMBODIMENT

CONVENTIONAL BASELINE

DDC/CDC ACCORDING TO ONE EMBODIMENT

CONVENTIONAL BASELINE

SYSTEM AND METHOD OF VEHICLE POWERTRAIN CONTROL

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of powertrains, and more particularly to the field of enhancing efficiency of powertrains having multiple power sources.

BACKGROUND

In comparison to a conventional engine-only based powertrain, a hybrid vehicle has several additional degrees of freedom corresponding to the operation of the electric motor and the battery charging and discharging. Powertrain control strategies for hybrid-electric vehicles (HEV)/plug-in hybrid electric vehicles (PHEV) have been widely investigated. The main goal is to enhance the vehicle fuel economy and minimize emissions while satisfying the expected driving performance. Conventional control strategies can be categorized as one of the following three types: (1) heuristic rule-based controllers; (2) global optimality methods; (3) equivalent consumption minimization strategies (ECMS). The rule-based control strategies are widely implemented in conventional HEVs/PHEVs, which often only optimize the performance of each component individually. Global optimization methods such as linear programming, genetic algorithms and dynamic programming can provide a globally optimal solution, but require pre-knowledge of the drive cycle information and tend to be computationally demanding. The global optimization controllers often cannot be used in real-time control, but they can be useful to provide a static benchmark for the development of the energy management controller. The equivalent consumption minimization strategies are real-time optimization control strategies based on calculating the fuel consumption of the ICE and equivalent fuel consumption of the electrical system. The purely mathematical optimization methodologies typically ignore drivability issues of the real vehicle and other practical considerations for the function of individual components. For example, the controller is configured to avoid overly frequent gear changes when small variations in speed take place, and when short-term oscillations between battery charging and discharging are undesirable.

The United States is considered the world's largest user of oil and refined petroleum products. Medium-duty (MD) and heavy-duty (HD) vehicles account for nearly 20% of the nation's transportation fuel consumption. HEV and PHEV technologies are well suited for many off-highway MD and HD vocational applications, such as buses, refuse, and delivery trucks and vans, which experience well-defined routes, frequent stops, long-time idling, and lower average speeds. Many U.S. nationwide fleets have shown significant interest and made commitments to hybridize and electrify part of their fleet, even with significant cost penalties, in order to benefit the community, environment, and economy. Significant market growth is likely in the future MD and HD hybrid electric vehicle sector.

SUMMARY

In general, one innovative aspect of the subject matter described herein is a system for controlling a powertrain of a vehicle, where the powertrain of the vehicle has a parallel hybrid configuration using an engine power source and an electric motor power source and battery system. The system may include a supervisory control module, and a database module communicatively coupled with the supervisory control module. The database module may be configured to store information on predetermined optimal performance and constraints corresponding to separate operation of the engine power source and the electric motor power source, and to concurrent operation of the engine power source and the electric motor power source, where the supervisory control module is configured to determine, based at least in part on the information stored in the database module, operations to be performed by the engine power source and the electric motor power source to maximize efficiency of the powertrain of the vehicle.

The foregoing and other embodiments can each optionally include one or more of the following features, alone or in combination. In particular, one embodiment includes all the following features in combination.

In some embodiments, the system may determine the operations to be performed by the engine power source and the electric motor power source. The supervisory control module may be configured to receive instantaneous or short-range drive cycle data for the vehicle, calculate tractive power and wheel torque, based on the received drive cycle data. The supervisory control module may be configured to identify optimal first operating characteristics and second operating characteristics, and to identify corresponding transmission operations, stored in the database module, for the identified optimal first operating characteristics and second operating characteristics. The supervisory control module may be configured to selectively control operation of the engine power source and the electric motor power source based on the identified optimal first operating characteristics and second operating characteristics as derived from the calculated tractive power and wheel torque, and to modulate the operation of the engine power source and the electric motor power source to smoothen operation of the powertrain of the vehicle.

In some embodiments, the first operating characteristics are operating characteristics of the engine power source, and the second operating characteristics are operating characteristics of the electric motor power source.

In some embodiments, the supervisory control module may be configured to self-calibrate and adjust, in conjunction with the smoothed operation, settings of the engine power source and the electric motor power source based on analysis of real-time traffic data and a current segment or route planned for the vehicle.

In some embodiments, to identify the optimal first operating characteristics and second operating characteristics, and the corresponding transmission operations, the supervisory control module may be configured to: monitor a state of charge for the battery system, and determine whether the powertrain of the vehicle is to be operated in battery charge depletion mode or battery charge sustaining mode. If it is the battery charge depletion mode, the supervisory control module may determine optimal gear selection, electrical motor torque and corresponding speed, via interpolation of data stored in the database module relating to operations of the electric motor power source. If it is the battery charge sustaining mode, the supervisory control module may determine optimal gear selection and engine and motor torques based on corresponding speed and wheel torque demand using data stored in the database module relating to the engine and electric motor operations.

In some embodiments, when the powertrain of the vehicle is to be operated in battery charge sustaining mode, the supervisory control module is configured to: activate the engine power source, in engine-propulsion and battery-charge mode, to charge the battery system when the state of charge of the battery system reaches a lower limit and while power of the engine power source is at its peak efficiency, or activate the engine power source, in engine-only propulsion mode, while power demands of the engine power source are higher than a power boundary of the engine power source.

In some embodiments, the vehicle is a hybrid vehicle.

In some embodiments, the hybrid vehicle is a plug-in hybrid vehicle.

In some embodiments, the vehicle is a bus.

In some embodiments, the engine power source is a natural gas engine.

In general, one innovative aspect of the subject matter described herein is a method for controlling a parallel hybrid powertrain of a vehicle, the parallel hybrid powertrain including a first power source and a second power source. The method may include storing first power source information on predetermined optimal operating parameters for separate operation of the first power source, storing second power source information on predetermined optimal operating parameters for separate operation of the second power source, and storing concurrent power source information on predetermined optimal operating parameters for concurrent operation of the first and second power sources. The method may include determining based at least in part on the first power source information, the second power source information, and the concurrent power source information, operations to be performed by the first and second power sources to maximize efficiency of the parallel hybrid powertrain of the vehicle.

The foregoing and other embodiments can each optionally include one or more of the following features, alone or in combination. In particular, one embodiment includes all the following features in combination.

In some embodiments, the first power source includes an engine power source, and the second power source includes an electric motor power source and battery system.

In some embodiments, the first power source information, second power source information, and concurrent power source information are stored in a database.

In some embodiments, the determining includes: receiving instantaneous or short-range drive cycle data for the vehicle; calculating tractive power, wheel torque, based on the received drive cycle data; identifying optimal first operating characteristics and second operating characteristics; identifying corresponding transmission operations, stored in a database module, for the identified optimal first operating characteristics and second operating characteristics; selectively controlling operation of the first power source and the second power source based on the identified optimal first operating characteristics and second operating characteristics and the calculated tractive power, wheel torque, and speed; and modulating the operation of the first power source and the second power source to smoothen operation of the parallel hybrid powertrain of the vehicle.

In some embodiments, the first power source is an engine; the second power source is an electric motor; the first operating characteristics are operating characteristics of the engine; and the second operating characteristics are operating characteristics of the electric motor.

In some embodiments, the method comprises adjusting operation of at least one of the first and second power sources based on analysis of real-time traffic data and a current segment or route planned for the vehicle.

In general, one innovative aspect of the subject matter described herein is a powertrain control system for a parallel hybrid powertrain of a vehicle, the parallel hybrid power source including a first power source and a second power source. The powertrain control system may include a memory operable to store first power source information, second power source information, and concurrent power source information, the first power source information pertaining to predetermined optimal operating parameters for separate operation of the first power source, the second power source information pertaining to predetermined optimal operating parameters for separate operation of the second power source, and the concurrent power source information pertaining to predetermined optimal operating parameters for concurrent operation of the first and second power sources. The control system may include a controller operably coupled to the memory, the controller configured to determine operating characteristics for the first and second power sources to maximize efficiency of the parallel hybrid powertrain of the vehicle, the controller configured to determine the operating characteristics based at least in part on the first power source information, the second power source information, and the concurrent power source information.

The foregoing and other embodiments can each optionally include one or more of the following features, alone or in combination. In particular, one embodiment includes all the following features in combination.

In some embodiments, the powertrain control system controller is configured to: receive instantaneous or short-range drive cycle data for the vehicle; calculate tractive power, wheel torque, and engine/motor speed based on the received drive cycle data; identify optimal first operating characteristics and second operating characteristics; and identify corresponding transmission operations, stored in memory, for the identified optimal first operating characteristics and second operating characteristics. The powertrain control system controller may selectively control operation of the first power source and the second power source based on the identified optimal first operating characteristics and second operating characteristics and the calculated tractive power, wheel torque, and speed; and modulating operation of the first power source and the second power source to smoothen operation of the parallel hybrid powertrain of the vehicle.

In some embodiments, the first power source includes an engine power source, and the second power source includes an electric power source and battery system.

In some embodiments, the first operating characteristics are operating characteristics of the engine power source, and the second operating characteristics are operating characteristics of the electric power source.

In some embodiments, the powertrain control system controller is configured to adjust operation of at least one of the first and second power sources based on analysis of real-time traffic data and a current segment or route planned for the vehicle.

In some embodiments, the powertrain control system controller is operable to identify optimal first operating characteristics and second operating characteristics, and corresponding transmission operations; the controller is configured to: monitor a state of charge for a battery system of the second power source, and determine whether the parallel hybrid powertrain of the vehicle is to be operated in battery charge depletion mode or battery charge sustaining mode, and if it is the battery charge depletion mode, determine optimal second power source torque and corresponding speed via interpolation of data stored in the memory relating to the second operating characteristics, or if it is the battery charge sustaining mode, then determine optimal first power source torque and corresponding speed using data stored in the memory relating to the first operating characteristics.

In some embodiments, the powertrain control system controller is configured to, when the parallel hybrid powertrain of the vehicle is to be operated in battery charge sustaining mode, activate the first power source: in a first power source propulsion mode and a simultaneous battery-charge mode, to charge the battery system, when the state of charge of the battery system reaches a lower limit, while power of the first power source is at its peak efficiency, or in a first power source-only propulsion mode, while power demands of the first power source are higher than the power of the first power source at its peak efficiency.

In some embodiments, the powertrain control system controller is incorporated into an eco-drive system, whereby the controller and the eco-drive system are operable to enhance operating efficiency of the vehicle.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

In one embodiment, an efficiency-based powertrain control strategy is provided that enables real-time optimization of powertrain efficiency for a plug-in hybrid electric bus (PHEB) while considering real vehicle drivability, operation of all or some powertrain components within functional constraints, and low CPU requirements. It is to be understood that although the disclosure describes several components in conjunction with a bus, the present disclosure is not so limited. One or more embodiments described herein may be utilized in any type of vehicle and any type of power-split hybrid vehicle powertrain.

By utilizing the ability of a plug-in hybrid electric vehicle (PHEV) or PHEB to store and extract energy using a battery and electric motor/generator, the PHEB engine in the control strategy according to one embodiment may run at a state that is near to or substantially at its peak efficiency, and any surplus or deficiency in power at this operating state may be compensated for by the electric motor/generator so that the extra energy is absorbed or supplied by the battery and the motor/generator.

In one embodiment, the control strategy is based on two primary functions. First, a component energy efficiency database (CEED) may be developed to rapidly select an initial targeted operating state that is determined from a set of efficiency maps characterizing the optimal powertrain control states as a function of the instantaneous vehicle operational condition. These efficiency maps are developed as part of the controller design based on the most efficient operating state at any required wheel torque and vehicle speed condition. Secondly, a supervisory control algorithm is established to manage data from multiple sources and to select the final powertrain operation state by moderating any conflicting target data based on powertrain drivability or component functional constraints, vehicle speed targets, and limitations.

I. Overview

Figure 1:
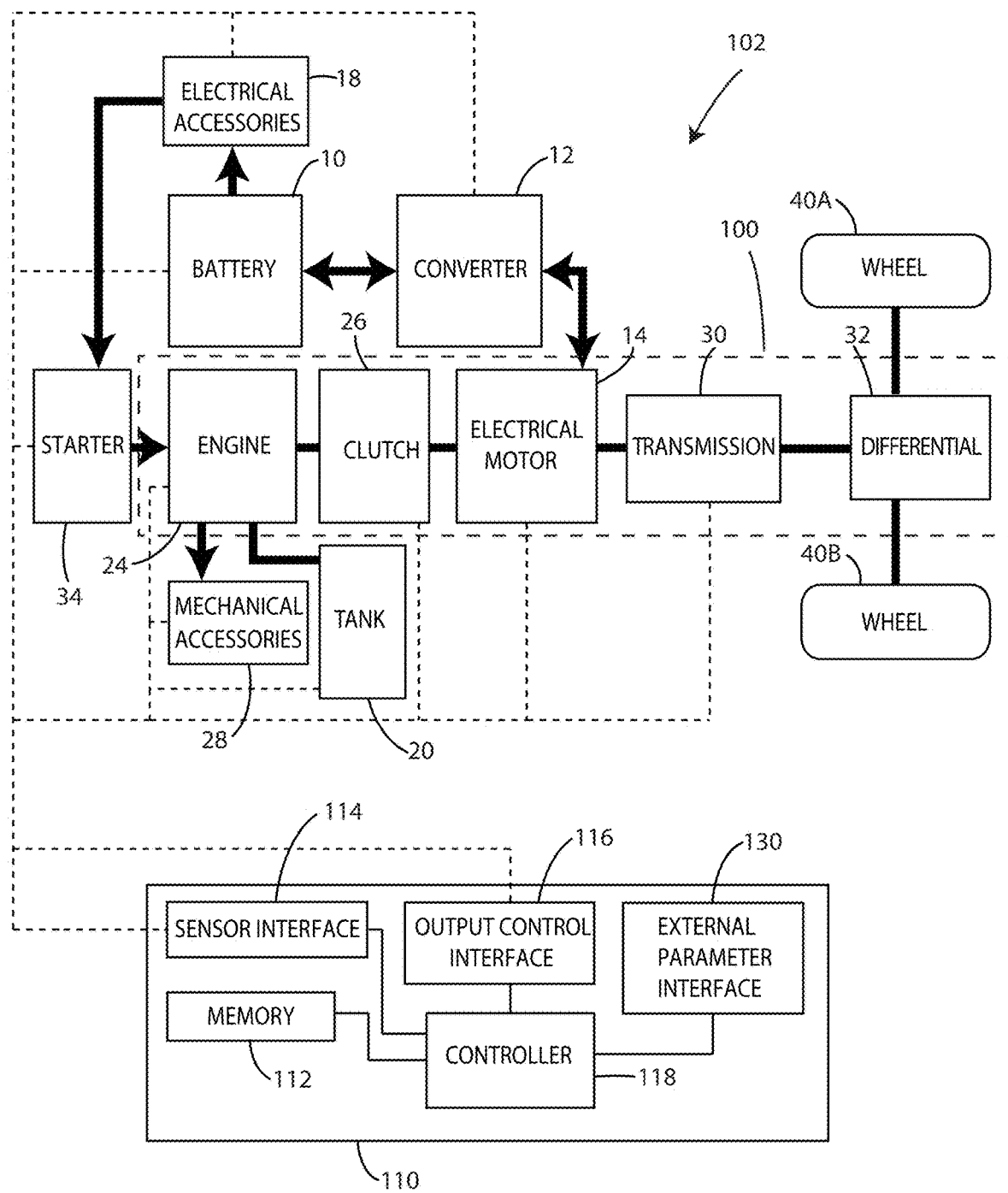
FIG. 1 shows a system in accordance with one embodiment of the present disclosure.

A powertrain for a vehicle system 102 in accordance with one embodiment is provided in FIG. 1 and generally designated 100. The powertrain 100 in the illustrated embodiment is a parallel powertrain having first and second power sources, respectively including an internal combustion engine or engine 24 and an electric motor or motor 14 in the illustrated embodiment. The first and second power sources may be operable to individually or collectively provide power to wheels 40A, 40B of the vehicle. For instance, the engine 24 and the motor 14 may, individually or jointly, provide power to the wheels 40A, 40B via a transmission 30 and a differential 32 (front or rear).

The type of transmission 30 may vary from application to application. For instance, in the illustrated embodiment, the transmission 30 includes a six-speed automatic transmission (e.g., six available gear ratios). For purposes of discussion, the available gear ratios are 3.51, 1.91, 1.43, 1.0, 0.74, and 0.65. However, the number of ratios and the ratios themselves may vary from application to application. As another alternative, the transmission 30 may be a continuously variable transmission (CVT) capable of steplessly altering its gear ratio. For purposes of discussion, the transmission 30 is coupled to the motor 14, which can drive the transmission 30 alone or jointly with power transferred from the engine 24 and a clutch 23 to the motor 14. The clutch 26 may enable selective transfer of power from the engine 24 to the motor 14, where the power may be used to drive the transmission 30 and/or to power the motor 14 to charge the battery 10. Although the transmission 30 is shown coupled to the engine 24 and the motor 14 with a clutch 26 therebetween, the transmission 30 may be separately coupled to the engine 24 and the motor 14 in an alternative embodiment. The transmission 30 in this configuration may be configured to receive power separately from the engine 24 and the motor 14 while each is operating at substantially the same speed. The transmission 30 may be configured differently, however, such that the engine 24 and the motor 14 may be operated at different speeds, while jointly providing power to the transmission 30.

As discussed herein, the motor 14 may be operable as a generator to charge a battery 10 based on power received via one or both of the engine 24 and regenerative braking. The speed of the motor 14 in this configuration may be substantially similar to or different from the speed of the engine 24. For purposes of disclosure the motor 14 is described as a motor; however, as mentioned, the motor 14 may be operable as both a motor and a generator. For instance, in one embodiment, any time the motor 14 receives power, the motor 14 may operate as a generator to charge the battery by converting the received mechanical power to electric power.

The differential 32 may be operable to receive power from the transmission 30 and to transmit power to the wheels 40A, 40B via a geared arrangement having a differential gear ratio. The transmission 30 in conjunction with the differential 32 may provide a final drive ratio between the rotational speed of the first and second power sources and the wheels 40A, 40B.

The engine 24 may be an internal combustion engine capable of receiving fuel (e.g., gasoline, diesel, or liquefied petroleum gas [LPG]) from a tank 20 or reservoir. The fuel may be mixed with air in a combustion chamber, and ignited to provide rotational force to a crank shaft, which can be coupled to the motor 14 via the clutch 26.

The motor 14 may be an electric motor as discussed herein, and capable of receiving power from a battery 10. A converter 12 may be provided to convert DC power from the battery 10 into an acceptable form of power for the motor 14, such as three-phase AC power. The motor 14 may also be operable to receive mechanical power from the engine 24 and generate electrical power, based on this received mechanical power, for charging the battery 10. The converter 12 may be operable to convert the electrical power received from the motor 14 and manage charging the battery 10 with the received electrical power.

The motor 14 may include a shaft coupled to the transmission 30. The shaft may not be directly coupled to the transmission 30; for instance, a torque converter may provide an interface between the motor 14 and the transmission 30.

In the illustrated embodiment, the powertrain 100 includes a powertrain control system 110 operable to direct operation of the first and second power sources for providing power or torque to the wheels 40A, 40B based on a directive from a vehicle operator. For instance, the powertrain control system 110 (e.g., an engine control unit) may be configured to receive a throttle input from a vehicle operator to direct an increase or decrease in wheel speed.

The powertrain control system 110 may include a sensor interface 114 that is operably coupled to one or more components of the vehicle, such as one or more of the battery 10, the converter 12, the motor 14, the transmission 30, the engine 24, and the tank 20 (e.g., a fuel tank or reservoir). The sensor interface 114 may be established via a communication network (e.g., CAN bus) and/or direct communication interfaces and one or more sensors disposed on a respective component of the vehicle. For instance, the engine 24 may include a variety of sensors such as a throttle position sensor, an RPM sensor, an oxygen sensor, and a manifold absolute pressure (MAP) sensor. As another example, the transmission 30 may include a speed sensor configured to provide an output indicative of wheel speed (e.g., based on the selected gear ratio). In yet another example, the battery 10 may include a sensor operable to provide battery status to the powertrain control system 110 via the sensor interface 114.

The sensor interface 114 of the powertrain control system 110 may be communicatively coupled to a controller 118 to provide to the controller 118 sensor information received from one or more components of the vehicle.

The powertrain control system 110 may also include an output control interface 116 that is operably coupled to one or more components of the vehicle, such as one or more of the battery 10, the converter 12, the motor 14, the transmission 30, the engine 24, and the tank 20. The output control interface 116 may be established via a communication network and/or direct communications. The connection between the output control interface 116 and one or more components of the vehicle may be shared with the connector for the sensor interface 114.

The controller 118 may be any type of microcontroller or microprocessor, and may include memory 112 in an integrated form or may be coupled to memory 112 in an external form. In general, the controller 118 and components of the powertrain 100, in addition to the controller 118 discussed herein, include circuitry and programming for carrying out the functions described herein. Such circuitry may include, but is not limited to, field programmable gate arrays, volatile or nonvolatile memory, discrete circuitry, and/or other hardware, software, or firmware that is capable of carrying out the functions described herein. The components of each component can be physically configured in any suitable manner, such as by mounting them all to a single circuit board, or they can be distributed across multiple circuit boards. The instructions followed by each of the controllers in carrying out the functions described herein, as well as the data for carrying out these functions, may be stored in memories mounted to each of components, or otherwise accessible to each controller.

In the illustrated embodiment, the powertrain control system 110 may include an external parameter interface 130 coupled to the controller 118, which as described herein, may be operable to obtain information external to the powertrain 100, such as route information and traffic information. As described herein, the controller 118 may process externally obtained information to determine a mode of operation that is considered efficient, optionally consisted to be the most efficient, for current operating conditions and parameters.

II. Powertrain Control

In one embodiment, a methodology of PHEV Modeling includes one or more of a Matlab/Simulink-based forward-looking powertrain model for PHEVs (including PHEBs), efficiency-based powertrain control strategy, and bus driving data. The details of the powertrain model, powertrain configurations and component assumptions, control strategy, and bus drive database are described herein in further detail.

Figure 2:
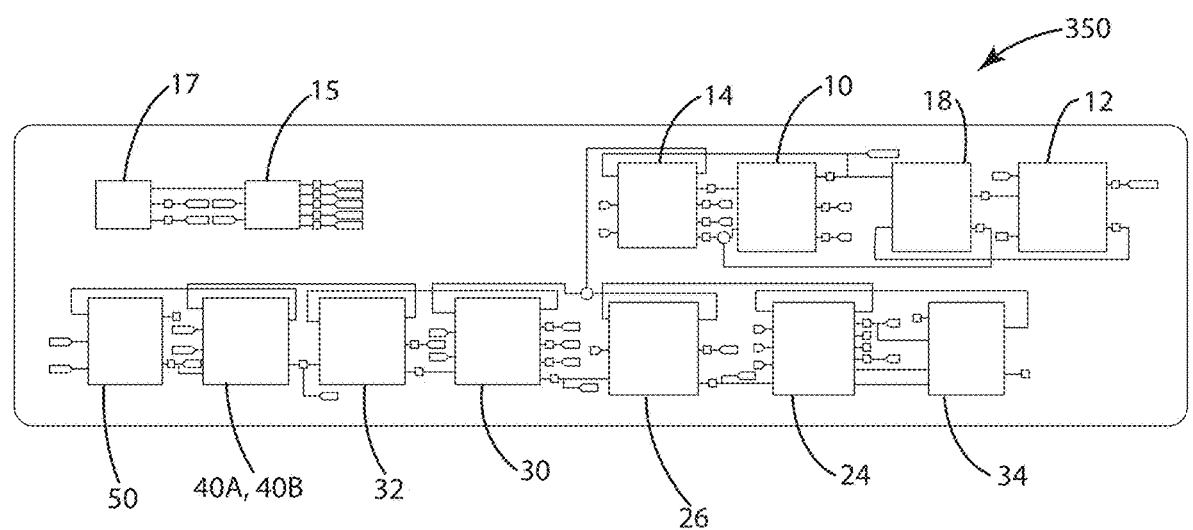
FIG. 2 shows a Matlab/Simulink model of a control system in accordance with one embodiment.

A Matlab/Simulink PHEV powertrain vehicle model, according to one embodiment, is designed for a general pre-transmission parallel hybrid configuration, and data for a vehicle-powertrain eco-operation system. A PHEV powertrain configuration (or a configuration for a powertrain 100) and a corresponding model framework or powertrain model 350 according to one embodiment are provided in the illustrated embodiments of FIGS. 1 and 2. The components identified in the powertrain model 350 include chassis, wheels 40A, 40B, final drive (or differential 32), transmission 30, clutch 26, engine 24, mechanical accessories 28, motor, inverter, battery 10, converter 12, electrical accessories 18, and a starter 34, as well as the driver model or vehicle operator model 15. External information such as route information 17 is also provided.

Figure 3:
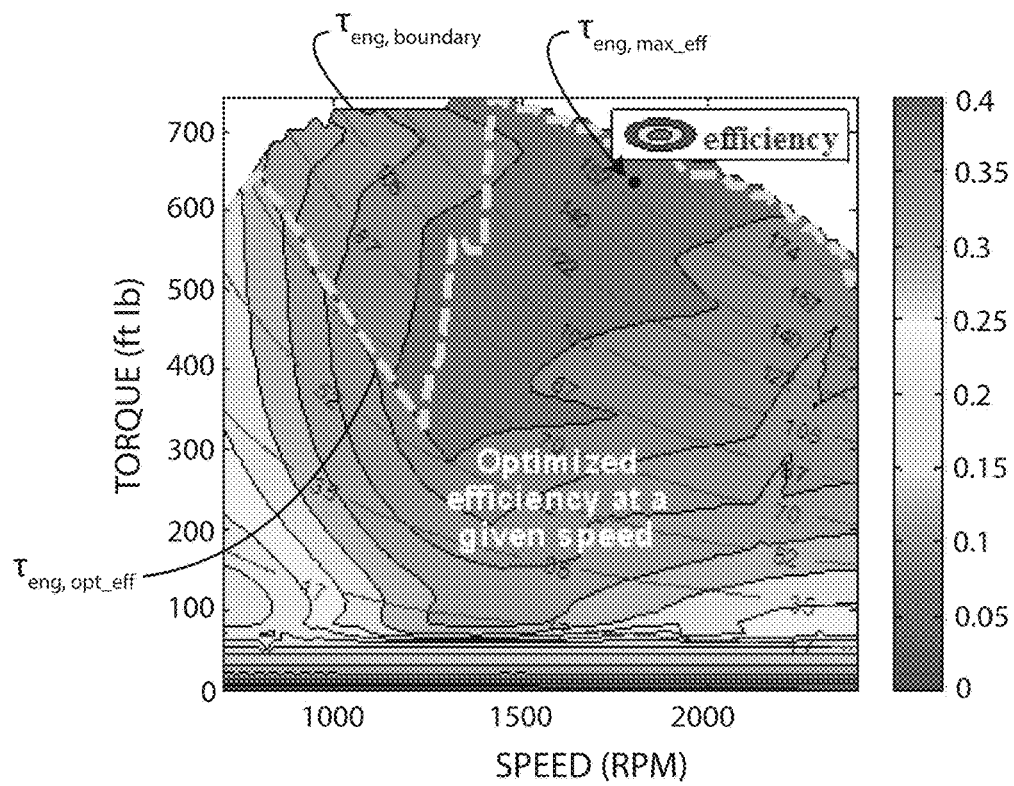
FIG. 3 shows engine performance maps for an engine in one embodiment.
Figure 4:
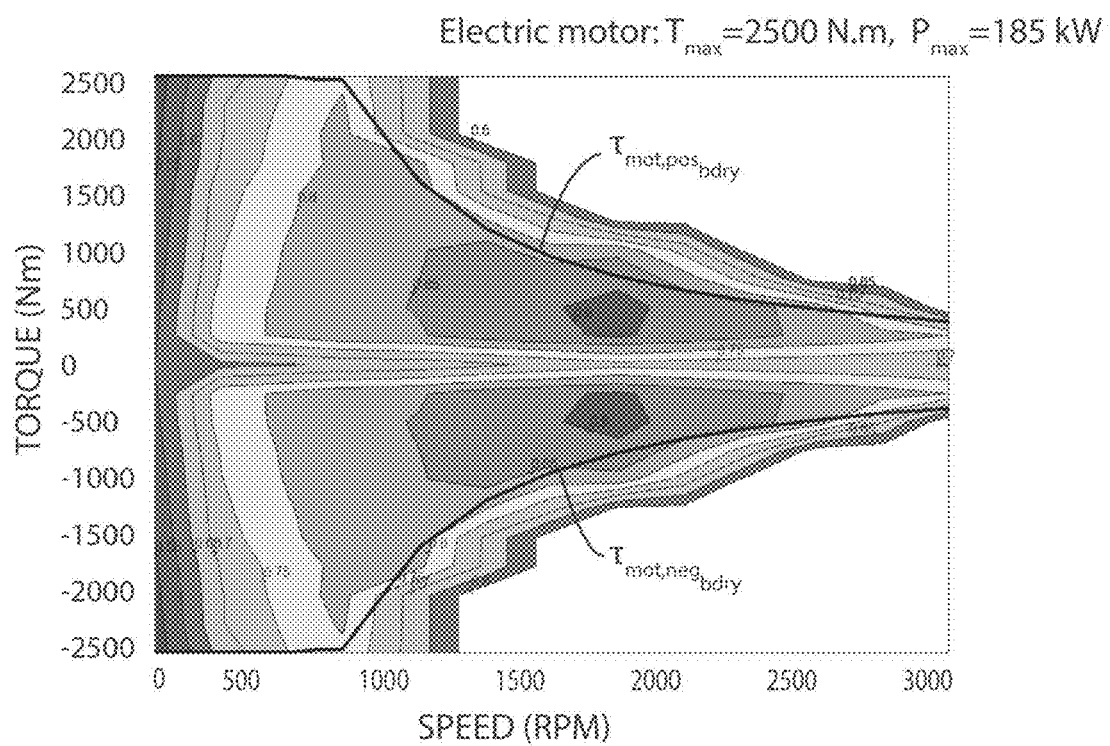
FIG. 4 shows motor performance maps for an engine in one embodiment.

In addition, there are control modules for the engine 24, the clutch 23, transmission 30, motor 14, battery 10, and PHEV controller or powertrain control system 110 that manages operating decisions related to engine and motor power split during propulsion and braking. The overall model may include Matlab initialization M-files and a Simulink module. Table 1 lists several specifications of the PHEV, where the vehicle weight, frontal area, rolling resistance, and aerodynamic drag coefficient are estimated using a tractive energy analysis of measurements from an actual bus of California Riverside Transit Authority (RTA). FIGS. 3 and 4 show the performance maps of the diesel engine and motor used in the modeled PHEV.

TABLE 1

Specifications of PHEV components

| Components | Parameters | Number |
| --- | --- | --- |
| 6.7 L Diesel engine | Max power (kW) | 180 |
| (Cummins ISB6.7G-240) | Max torque (Nm) | 750 |
| Motor (TM5035C) | Max power (kW) | 185 |
|  | Max torque (Nm) | 2500 |
| Battery (A123) | Capacity (kWh, Ah) | 44 kWh, 66 Ah |
|  | Normal Voltage (V) | 580 |
| Transmission | $1^{st}$ Gear ratio | 4.70 |
| (6-speed Allison 4500) | $2^{nd}$ Gear ratio | 2.21 |
|  | $3^{rd}$ Gear ratio | 1.53 |
|  | $4^{th}$ Gear ratio | 1.00 |
|  | $5^{th}$ Gear ratio | 0.76 |
|  | $6^{th}$ Gear ratio | 0.67 |
| Final drive (Rockwell 4.56:1) | Differential ratio | 4.56 |
| Wheel (305/70R22.5) | Wheel radius (m) | 0.4993 |
| Chassis | Vehicle mass (kg) | 14,515 |
|  | Frontal area ($m^2$) | 9.0 |
|  | Rolling resistance coeff | 0.009 |
|  | Aerodynamic drag coeff | 0.7 |
| Accessory | Accessory load (kW) | 5.0 |

Figure 5:
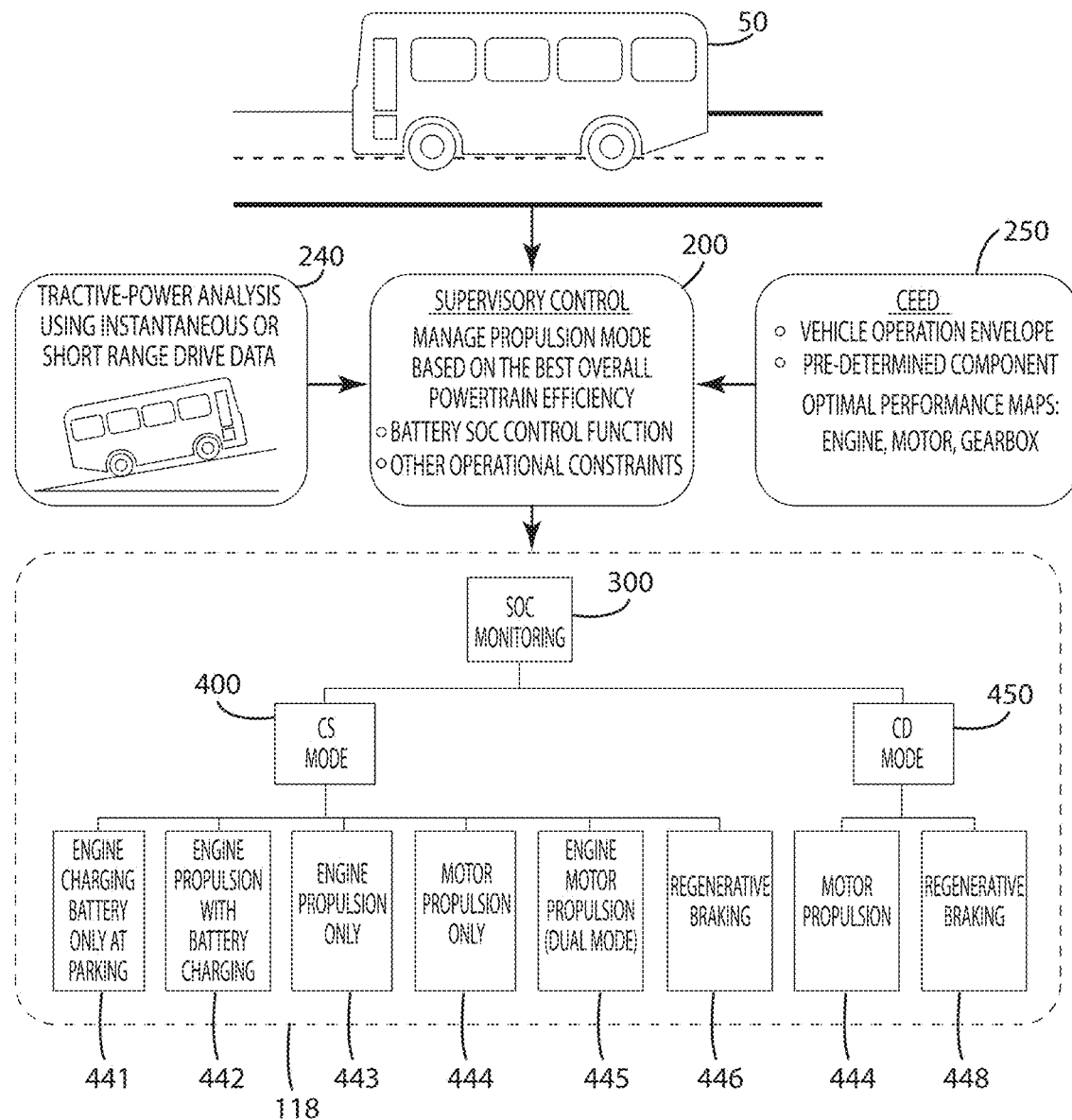
FIG. 5 shows a method of operation in accordance with one embodiment.

The efficiency-driven powertrain control methodology in one embodiment enables real-time optimization of powertrain efficiency while accounting for real vehicle drivability, feasible component operation, and computational requirements that are appropriate for real-time control. The powertrain control methodology in one embodiment is shown in FIG. 5, and includes at least two parts: a component energy efficiency-driven database (CEED) 250 and a battery SOC supervisory control system 200. FIG. 5 depicts a framework of this control strategy. The CEED 250 is used to define a vehicle operation envelope for a given powertrain and components, and to establish pre-determined component optimal performance maps for the engine 24, the motor 14, and the gearbox or transmission 30, and optionally one or more components of the powertrain 100. The battery SOC supervisory control system 200 may be used through regulating state of charge (SOC) level to account for complex powertrain operation, including six modes in charge-sustaining (CS) mode 400 and two modes in charge-depletion (CD) mode 450. More than or less than these numbers of modes may be provided for the CS mode 400 and/or the CD mode 450. In the illustrated embodiment, the CS mode 400 may include an EV mode (or motor only mode) 444, an engine only mode 443, an engine propulsion with battery charging mode 442, an engine and motor propulsion mode 445 (e.g., a power split mode), a charging only mode 441 (e.g., engine charging battery only at parking), and a regenerative braking mode 446. The CD mode 450 may include an EV mode 444 and a regenerative braking mode 446. The modes shared by the CD mode 450 and the CS mode 400 may be substantially the same or different based on their operation within a respective one of the CD mode 450 and the CS mode 400. For instance, in the CD mode 450, if the battery were already completely charged, regenerative braking may not be used to provide power to the battery 10.

In the illustrated embodiment of FIG. 5, the battery SOC supervisory control system 200 is configured to receive information pertaining to tractive torque demand for the vehicle 50 from a tractive analysis system 240 using external information as route information 17.

Figure 6:
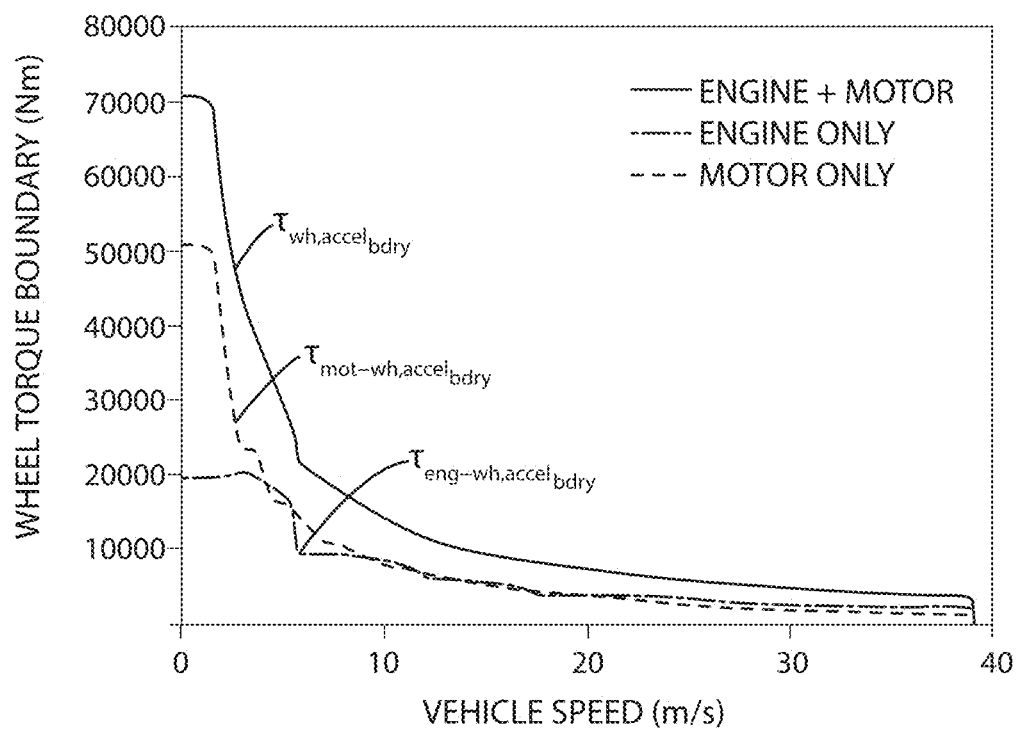
FIG. 6 shows a vehicle wheel torque boundary in one embodiment for an equipped engine, motor, and transmission.
Figure 7:
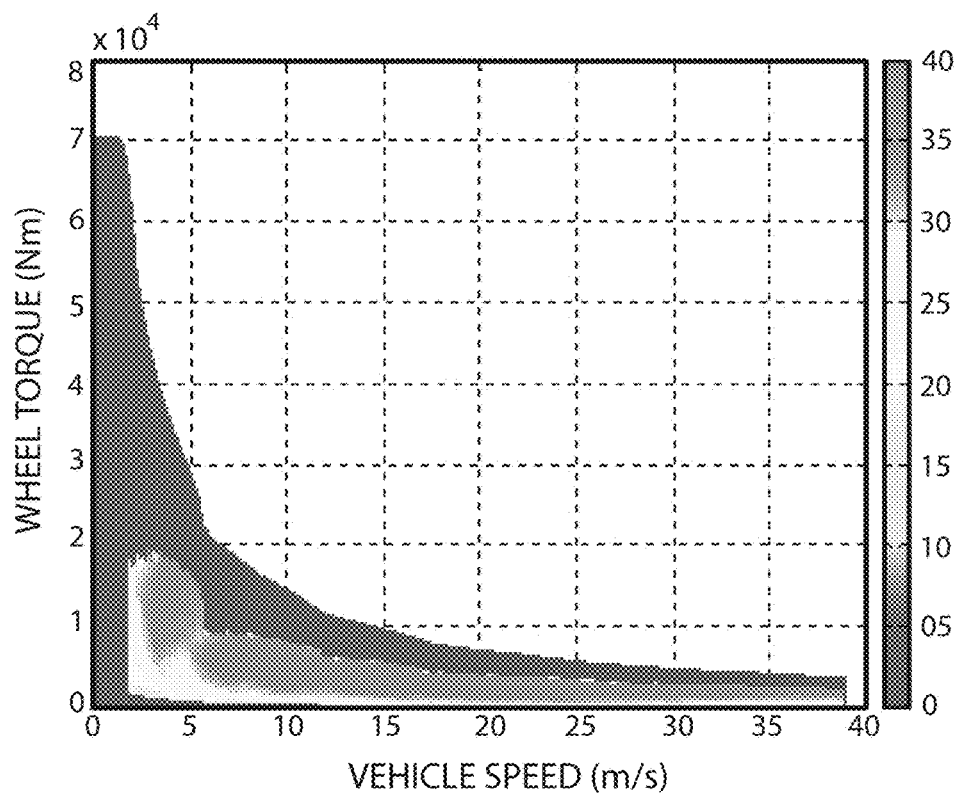
FIG. 7 shows optimal engine-based powertrain efficiency in one embodiment.
Figure 8:
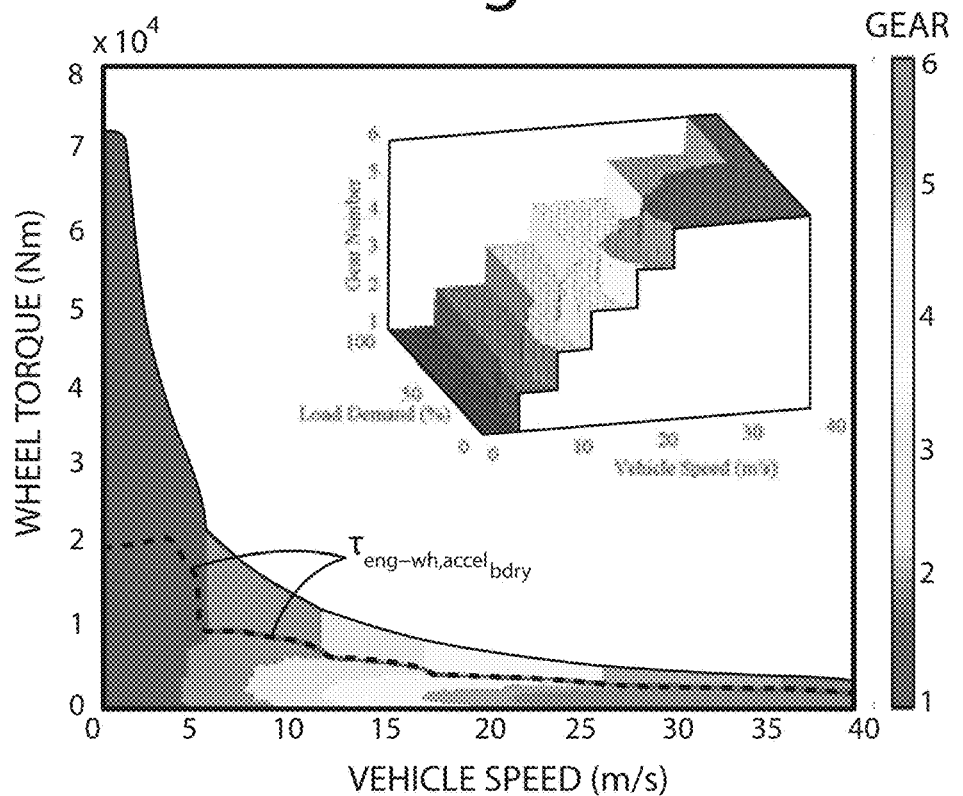
FIG. 8 shows optimal transmission gear selection over a vehicle wheel torque boundary enabled with the engine in one embodiment.
Figure 9A:
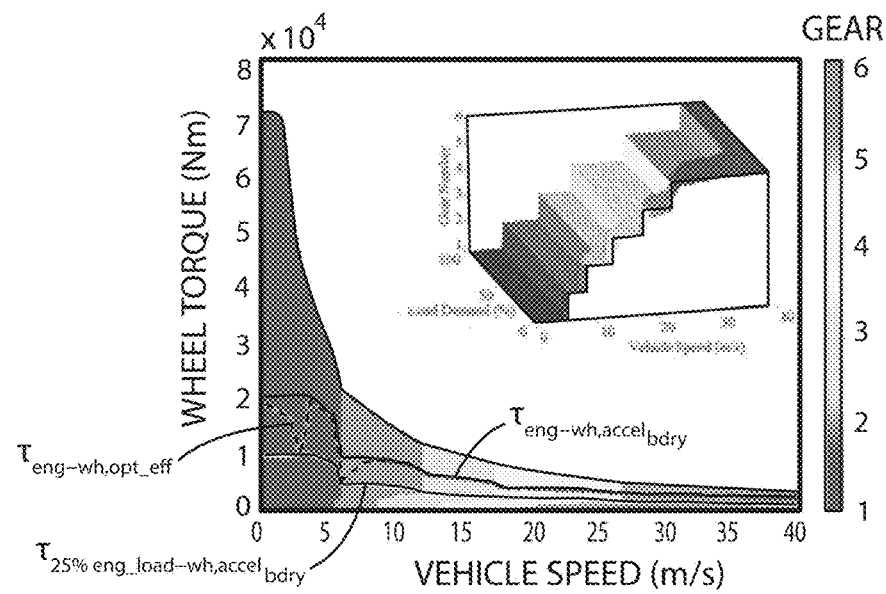
FIG. 9A shows optimal transmission gear selection with 25% of engine load propelling the vehicle and the remainder used for charging in accordance with one embodiment.
Figure 9B:
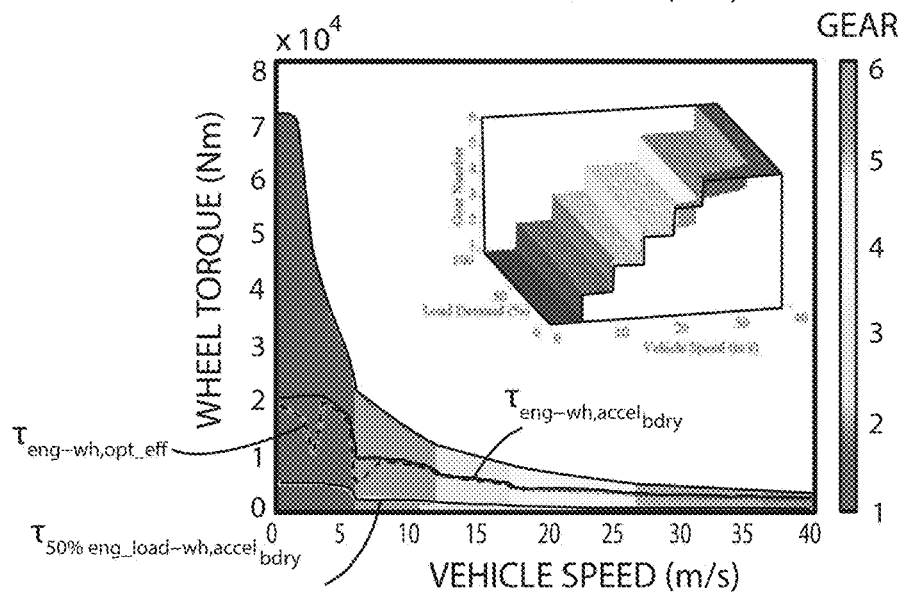
FIG. 9B shows optimal transmission gear selection with 50% of engine load propelling the vehicle and the remainder used for charging in accordance with one embodiment.
Figure 9C:
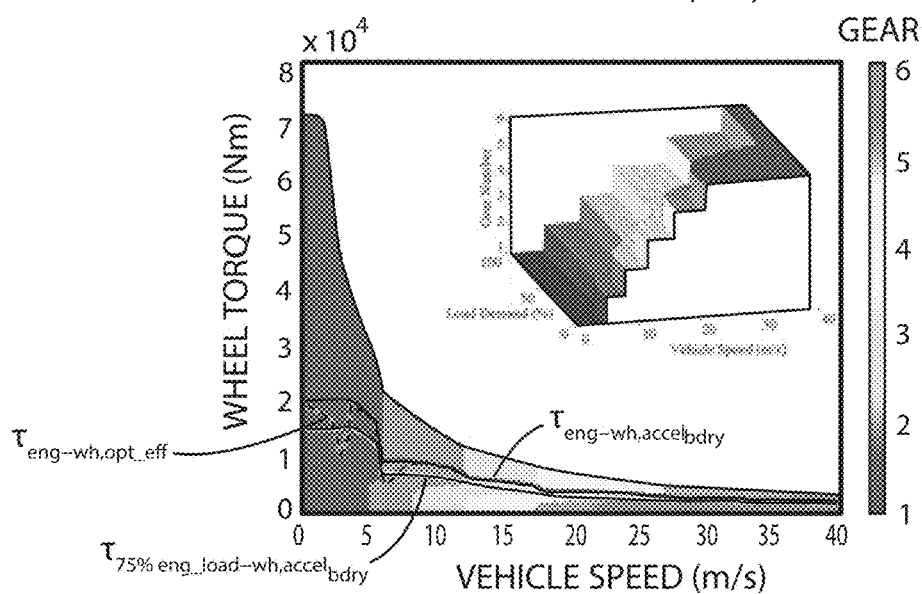
FIG. 9C shows optimal transmission gear selection with 75% of engine load propelling the vehicle and the remainder used for charging in accordance with one embodiment.
Figure 10:
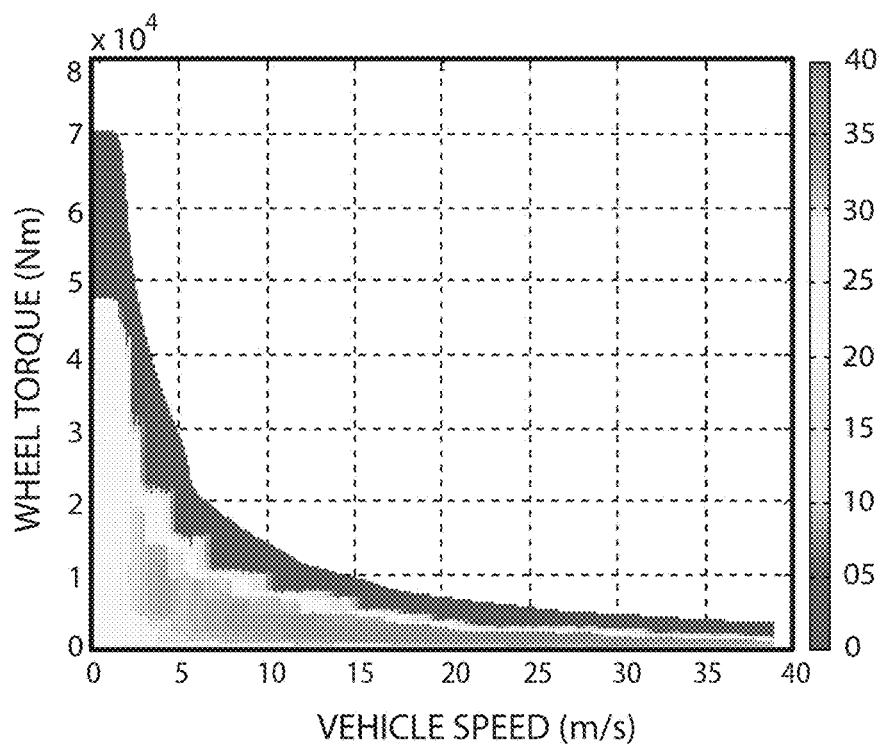
FIG. 10 shows optimal motor-based powertrain efficiency in one embodiment.
Figure 11:
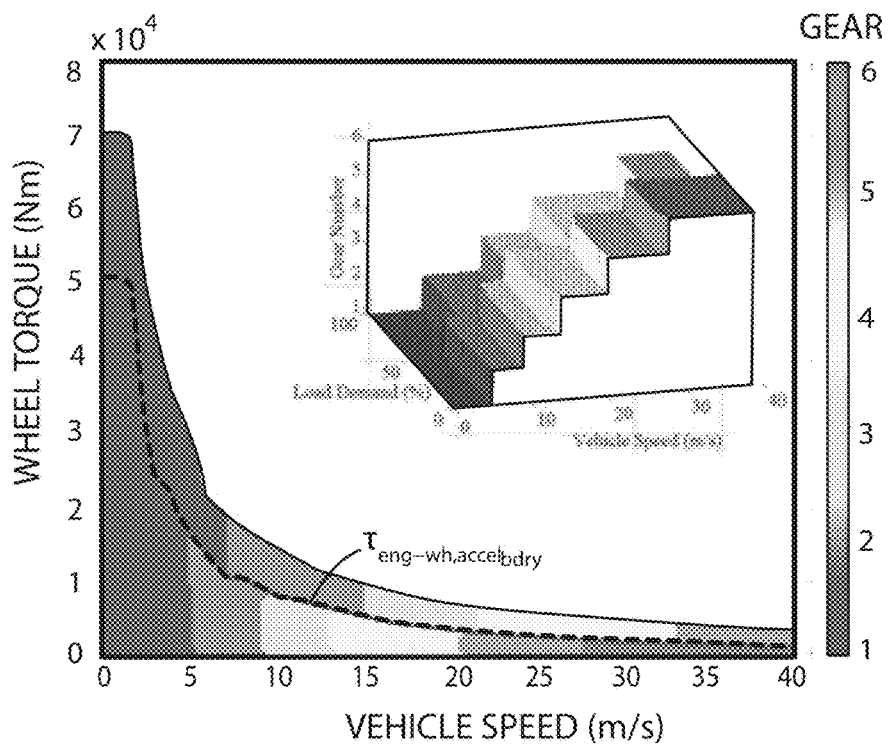
FIG. 11 shows optimal transmission gear selection over a vehicle wheel torque boundary enabled with the motor in one embodiment.

The CEED 250 may be provided to establish pre-determined optimal performance tables for multiple power-source powertrains. First, the CEED 250 may characterize the operating envelope of wheel torque available for a given PHEV at each speed level over a full potential range of driving conditions, and includes consideration of the vehicle weight and road conditions (including grade). The full operating envelope is based on the available power from the engine and the motor combined. FIG. 6 shows the vehicle wheel torque boundary enabled with the engine and motor used in the modeled PHEV. Second, the CEED 250 may be based on generation of optimal operation for engine-based or motor-based powertrain performance efficiency tables, as functions of vehicle speed and wheel torque, as well as their corresponding transmission tables for the selection of gear ratio, which are derived from the PHEV engine, motor and transmission maps. Gear upshift and downshift maps are generated based on the optimized gear maps. The related results are plotted in FIGS. 7 and 8. Similarly, a set of optimal operation tables and plots may be developed for combined engine and motor operation in a power split mode during which the engine 24 propels the PHEV with the assistance of the motor 14 (for heavy load conditions), and for combined engine 24 and generator (motor 14) operation during periods of opportunistic charging when loads are light but engine operation is still desirable as shown in FIGS. 9A-C. FIG. 10 shows motor-based powertrain efficiency in one embodiment, with FIG. 11 depicting optimal transmission gear selection over the vehicle wheel torque boundary enabled with the motor.

Figure 12A:
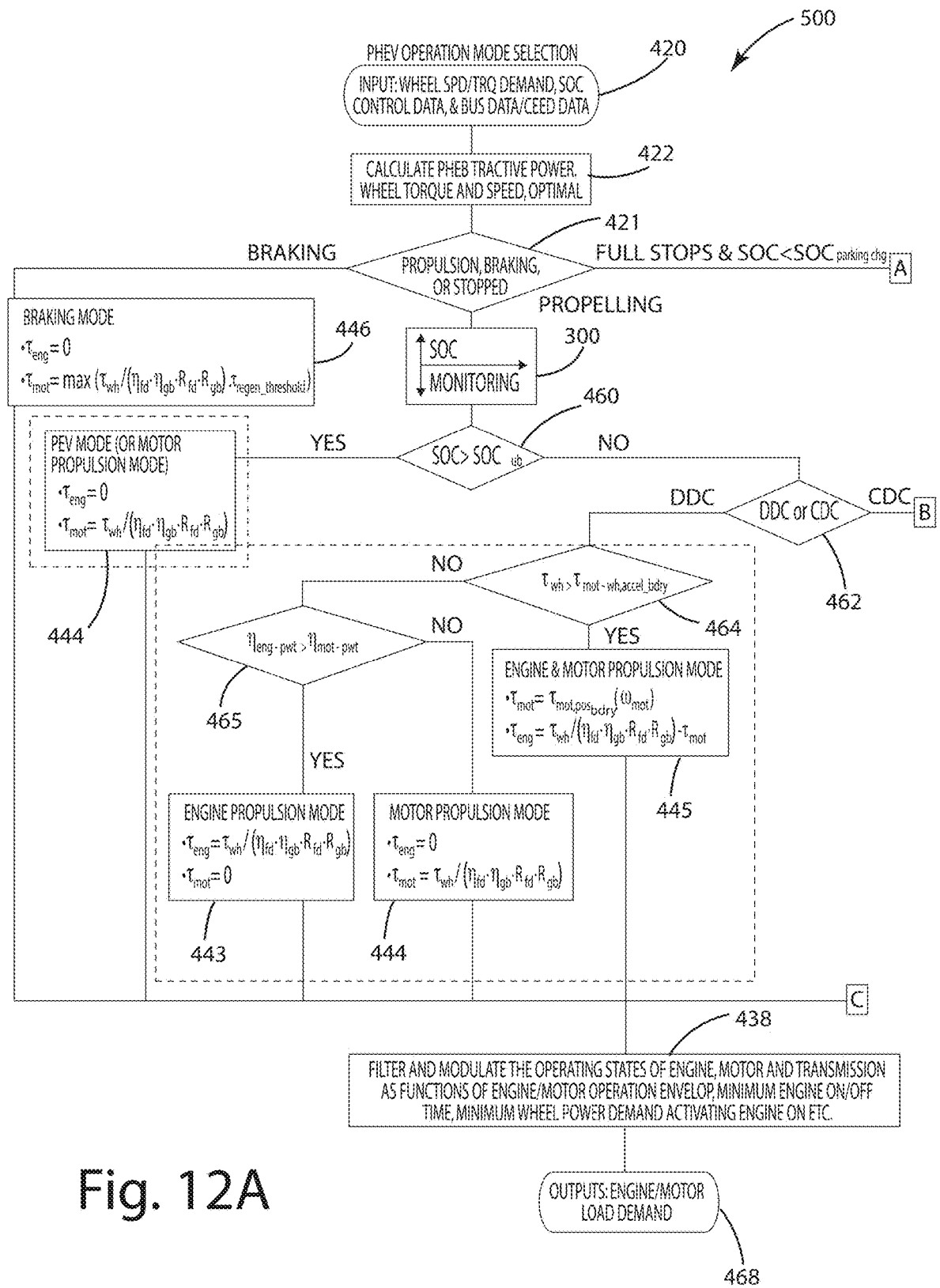
FIGS. 12A-B shows a method of operation in accordance with one embodiment.
Figure 12B:
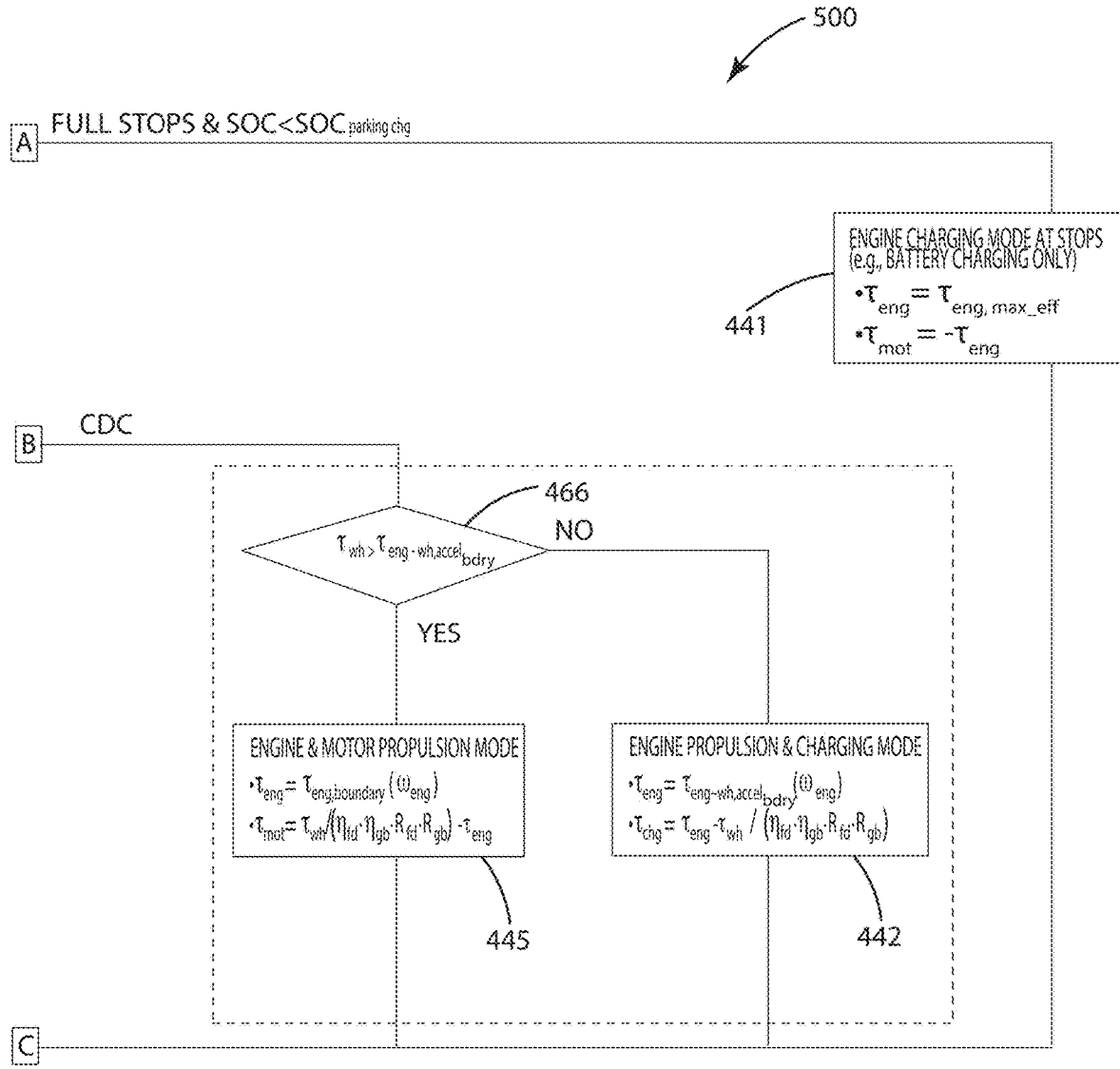

In one embodiment, a method 500 of operation is shown in FIGS. 12A-B and described in further detail herein. The method 500 may be conducted by a controller 118 in conjunction with the supervisory control system 200 of FIG. 5, which is configured to use data from the CEED 250, vehicle speed, and tractive torque demand information related to instantaneous driving environment in order to optimize the motor and engine operating state, providing maximum powertrain efficiency for both the CD mode 450 and the CS mode 400. It is noted that modes of the method 500, as described herein, are depicted within the controller 118 for purposes of disclosure to indicate that the controller 118 may perform the method 500 in accordance with one embodiment.

Figure 13:
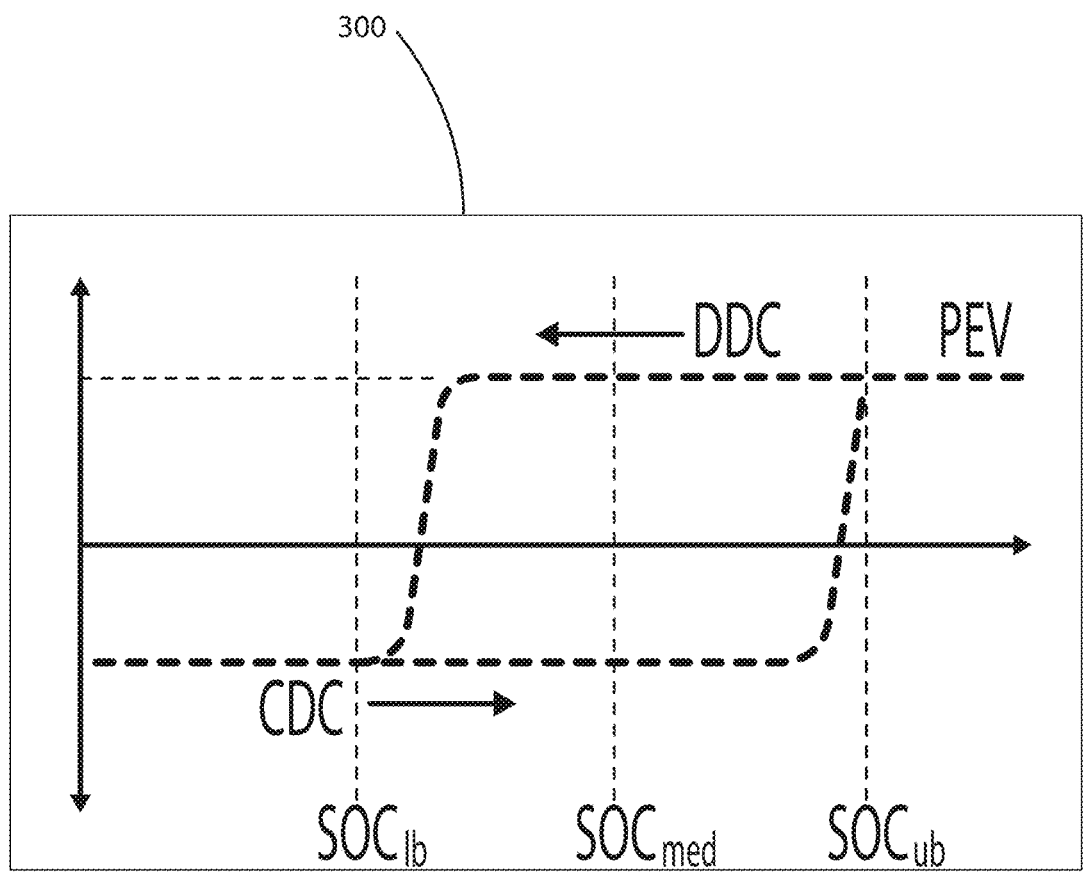
FIG. 13 shows a SOC control method in accordance with one embodiment.

With respect to the illustrated embodiment of FIGS. 12A-B and the method 500, the controller 118 may be operable to determine a mode of operation and to provide operating parameters based on one or more inputs, such as wheel speed, torque demand, SOC control data, vehicle data, and CEED data. Step 420. For instance, the method 500 in the illustrated embodiment may be operable to determine whether to operate in the CS mode 400 or the CD Mode, where the CS mode 400 is further defined into discharge dominant control (DDC) and charging dominant control (CDC) as described herein. Steps 420, 422, 421, 300, 460, 462. Thus, based on the upper and lower boundaries of SOC management (i.e., $SOC_{lb}$ and $SOC_{ub}$) at CS mode 400, the supervisory control method 500 in one embodiment may consider three propulsion control processes: PHEV charge depletion (e.g., motor only propulsion mode 444), DDC, and CDC. When $SOC > SOC_{ub}$, the control method may select the PHEV DC mode (e.g., the motor only propulsion mode 444). Step 460. After the SOC decreases below $SOC_{ub}$, the operation is in charge sustaining mode and the controller switches between the DDC and CDC processes each time the specified values of $SOC_{ub}$ and $SOC_{lb}$ are reached, ensuring safe and reliable battery operation. If $SOC \leq SOC_{lb}$, the method 500 may adopt CDC. Steps 460, 462. The steps are shown in FIGS. 12-13, with FIG. 13 providing mode selection for the engine and motor torque demand in all DDC and CDC modes.

During the DDC mode, the PHEV runs engine propulsion mode 443, motor propulsion mode 444, and combined engine and motor propulsion mode 445. The mode selection is based on $\tau_{whl,dmd}$ and $\tau_{mot-wh,accel_{bdry}}$, as well as $\eta_{eng-pwt}$ and $\eta_{mot-pwt}$. Steps 464, 465. During the CDC mode, the PHEV allows engine propulsion with charging mode 442 and combined propulsion mode 445 based on $\tau_{whl,dmd}$ and $\tau_{eng-whl,accel_{bdry}}$. Step 466. In addition, braking mode 446 occurs at both CDC, DDC and DC modes once PHEV decelerates its speed. Also the control allows for engine charging at parking stops 441 if $SOC < SOC_{parking,chg}$.

The supervisory control method 500 may enable maximizing engine and motor efficiencies. For example, in selecting the engine or motor propulsion mode during the DDC process, the supervisory control may compare $\eta_{mot-pwt}$ and $\eta_{eng-pwt}$ to optimally determine the propulsion mode selection, which may be considered a form of an equivalent consumption minimization strategy (ECMS). In the control method 500, if the battery SOC reaches $SOC_{lb}$, the control switches to CDC mode, where the engine charges the battery with the power at appropriate peak efficiency for any given engine speed, particularly not under high vehicle tractive power demand. Step 462. The supervisory control may also allow the engine to only charge the battery or charge the battery (in an engine propulsion and charging mode 442) while a portion of the engine power is used to propel the PHEV with this efficiency-based strategy. However, if the power demand of the PHEV is higher than the engine power at peak efficiency, the operation is temporarily switched to the engine propulsion mode 443, without motor assistance or optionally with motor assistance as engine and motor propulsion mode 445.

In one embodiment, the method 500 may also implement filtering and modulating of the operating states of the engine 24, the motor 14, and the transmission 30 based on the actual usage to achieve acceptable vehicle drivability and real-time component operation that is within normal functional limits. Therefore, the method 500 for controlling the powertrain 100 may enable the powertrain efficiency to be optimized in real-time via smart management of electrical and mechanical powertrain operations, together with the smart and reliable SOC management while adopting efficiency-driven engine charging.

III. PHEV Powertrain, Component, and DDC/CDC Control Strategy

The method 500 may operate to account for PHEV components that impact driving efficiency, including one or more of the following: the engine 24, the transmission 30, the battery 10, the motor 14, torque coupler, final drive (differential 32), wheel 40A, 40B, chassis, and accessory loads. The method 500 may be based in part on simulation results generated from the model provided in FIG. 2. In one embodiment, the model may simulate results based on data and models obtained with respect to related components, several of which are described under this Section.

A. Tractive Force Demand Model

The method 500 in one embodiment may be based on the tractive power demand to account for vehicle forward acceleration, aerodynamic loss, rolling resistance loss, and road grade. The comprehensive tractive force required at any time is given as follows:

$$F_{tract} = m \cdot \frac{dV}{dt} + \frac{1}{2} \rho \cdot C_d \cdot A_f \cdot V^2 + m \cdot g \cdot C_{rr} \cdot \cos\theta + m \cdot g \cdot \sin\theta \quad (1)$$

where $F_{tract}$ is the required vehicle tractive force; V is vehicle velocity; $\rho$ is air density; $C_d$ is the aerodynamic drag coefficient; $C_{rr}$ is the rolling resistance coefficient; $A_f$ is the projected frontal area; $\theta$ is the road grade; and m is the vehicle mass. The mass is determined from the curb weight of the EV and the passenger and cargo weight. The curb weight includes the complete mass of the vehicle, including a full tank of fuel and all other fluids, but not the mass of passengers or cargo. It is to be understood that definition of curb weight is exemplary and non-limiting. The curb weight may vary depending on the application. The evaluation of aerodynamic drag, rolling resistance, and road grade on the EV tractive force demand is addressed in the chassis and wheel component modules shown in FIG. 2 and may be utilized in the method 500.

B. Engine and Starter Models

The method 500 in one embodiment may be based on a map-based performance model to account for the fuel consumption of the engine 24 over the entire engine operating conditions. The engine performance may vary with transient vehicle load demands and frequent engine on/off switching. Thus it is useful to accurately predict the transient engine performance as functions of speed, load, and engine on/off switching.

$$f_{fuel} = \begin{cases} f_{fmap}(\omega_{eng}, \tau_{eng}) & \forall (\tau_{eng} \geq 0) \cap (S_{eng,st} = 1) \\ 0 & \forall (\tau_{eng} < 0) \cap (S_{eng,st} = 1) \\ 0 & \forall (S_{eng,st} = 0) \end{cases} \quad (2a)$$

and $$S_{eng,st} = \begin{cases} 1 & \forall (\omega_{eng} \geq \omega_{eng,min}) \cap (S_{eng,on} = 1) \\ 0 & \forall (\omega_{eng} < \omega_{eng,min}) \cup (S_{eng,on} = 0) \end{cases} \quad (2b)$$

where $f_{fuel}$ and $f_{fmap}$ are engine transient fuel consumption and fuel consumption maps, respectively; $\omega_{eng}$ and $\tau_{eng}$ are engine speed and torque, respectively; $S_{eng,st}$ is engine state signal, which is estimated based on the constraint conditions of $S_{eng,on}$, engine on signal requested from powertrain control module, and engine speed.

C. Electric Motor and Inverter Model

The method 500 in one embodiment may be based on a map-based performance model to account for the energy consumption of the electric motor 14 and inverter over the entire motor operating conditions. The map-based model may adopt the efficiency maps of motors and inverters, which can be generated from experimental data measured under steady-state conditions over a pre-defined matrix of speed and torque combinations. In the electric motor and inverter performance models, the motor's output mechanical power may be defined by Eq. 3(a), and the inverter input electrical power is estimated using Eq. 3(b). The inverter input electrical power may be assumed to be equivalent to the battery power output, defined in Eq. 3(c). The motor and inverter efficiencies are based on interpolations of the efficiency maps that have been tabulated over a range of motor speed and torque. A constraint given in the motor model is that the maximum torque delivery is not allowed to exceed the boundary of motor torque output. The curve for the motor torque boundary shown in FIG. 4 is $\tau_{mot,poS_{bdry}}$, and the motor regeneration torque boundary is assumed to be $\tau_{mot,neg_{bdry}} = -\tau_{mot,pos_{bdry}}$.

$$W_{mot,me} = \omega_{mot} \tau_{mot} \quad (3a)$$

$$W_{inv,ee} = W_{mot,me}/(\eta_{mot}(\omega_{mot}, \tau_{mot}) \cdot \eta_{inv}(\omega_{mot}, \tau_{mot})) \quad (3b)$$

$$W_{inv,ee} = I_{batt} \cdot V_{batt} \quad (3c)$$

where the terms $W_{mot,me}$ and $W_{inv,ee}$ are motor mechanical power output and inverter electrical power input, respectively; $\omega_{mot}$ and $\tau_{mot}$ are motor speed and torque, respectively; $\eta_{mot}$ and $\eta_{inv}$ are motor and inverter efficiencies, which are considered as functions of motor speed and torque, and they are estimated based on the interpolation of the motor and inverter maps; $I_{batt}$ and $V_{batt}$ are battery current and voltage output.

D. Li-Ion Battery Model

Figures 14, 15:
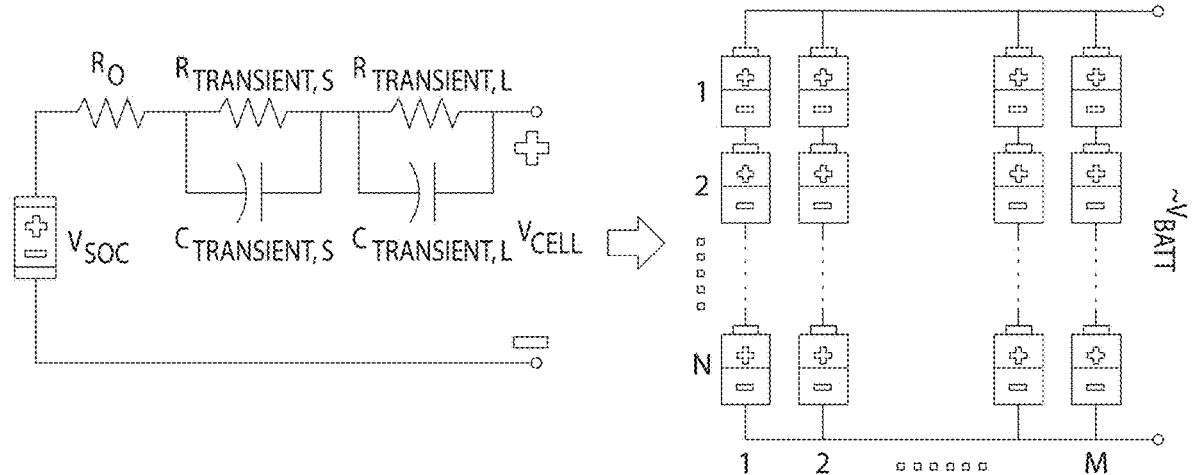
FIGS. 14 and 15 show an equivalent-circuit battery cell dynamic model in one embodiment for simulating a battery package including multiple serial and parallel battery cells, with FIG. 14 showing a single battery cell configuration and FIG. 15 showing a battery package configuration.

The method 500 in one embodiment may be based on a battery package model that is based on an equivalent circuit of multiple serial and parallel battery cells, each of which is assumed to have the same performance. For single battery cell modeling, an RC-based equivalent-circuit battery cell dynamic model is provided to address transient response physics using electrical circuit analog components based on the electrical network consisting of a series resistor and two RC parallel networks, as shown in FIGS. 14 and 15. The considered components include voltage sources, variable resistors, and capacitors. More specifically, the equivalent-circuit model accounts for open-circuit voltage, ohmic resistances in the connector, electrodes and electrolyte, and two sets of parallel resistor-capacitor combinations to reproduce the effects of mass transport and the electric double layer, respectively. In addition, the impact of temperature and charging/discharging rate on battery SOC are also identified. The details are outlined in Eqs. 4(a)-4(e). Based on the required overall battery package capacity and voltage, a combination of series and parallel connections may be established to model the whole vehicle battery module, as show in FIG. 14 and Eqs. 4(f)-4(g).

$$\frac{dV_{tran,L}}{dt} = \frac{I_{cell}}{C_{tran,L}} - \frac{V_{tran,L}}{R_{tran,L} \cdot C_{tran,L}} \quad (4a)$$

$$\frac{dV_{tran,S}}{dt} = \frac{I_{cell}}{C_{tran,S}} - \frac{V_{tran,S}}{R_{tran,S} \cdot C_{tran,S}} \quad (4b)$$

$$V_{cell} = V_{SOC} - I_{cell} \cdot R_o - V_{tran,L} - V_{trans,S} + \Delta\varepsilon(T_{cell}) \quad (4c)$$

$$m_{cell} C_{pcell} \frac{dT_{cell}}{dt} = I_{cell} \cdot R_o + \frac{V_{tran,L}^2}{R_{tran,L}} + \frac{V_{tran,S}^2}{R_{tran,S}} - hA(T_{cell} - T_{amb}) \quad (4d)$$

$$SOC = \frac{1}{C_{cell}} \int \alpha(I_{cell}) \beta(T_{cell}) I_{cell} dt \quad (4e)$$

$$V_{batt} = N_{series} \cdot V_{cell} \quad (4f)$$

$$I_{batt} = M_{parallel} \cdot I_{cell} \quad (4g)$$

where $V_{SOC}$ is the open circuit voltage which is a non-linear function of SOC and normally measured as the steady-state open circuit terminal voltage at various SOC points; $V_{tran,S}$ and $V_{tran,L}$ are voltages of short- and long-time step responses of RC networks, respectively; $R_{tran,S}$, $R_{tran,L}$, $C_{tran,S}$, and $C_{tran,L}$ represent short- and long-time constants of the step response of RC networks; Ro is a series resistor; $V_{cell}$ and $I_{cell}$ are the battery cell output voltage and current; $V_{batt}$ and $I_{batt}$ are the modeling voltage and current of the overall battery package with $N_{series}$ battery cells in series and $M_{parallel}$ battery cells in parallel; $\Delta\varepsilon$ is the temperature-dependent potential-correction term for the battery; $\alpha(I_{cell})$ is a charging/discharging rate factor; $\beta(T_{cell})$ is a temperature factor; $T_{cell}$ and $T_{amb}$ are battery cell and ambient temperature; $m_{cell}C_{pcell}$ and hA are battery cell mass capacity and heat transfer rate, respectively.

$V_{SOC}$, $R_{tran,S}$, $R_{tran,L}$, $C_{tran,S}$, and $C_{tran,L}$, as well as $\Delta\varepsilon(T_{cell})$, $\alpha(I_{cell})$, and $\beta(T_{cell})$, depend on individual battery type, design, and fabrication. $V_{SOC}$, $R_{tran,S}$, $R_{tran,L}$, $C_{tran,S}$, and $C_{tran,L}$ are normal functions of SOC. $\Delta\varepsilon(T_{cell})$, $\alpha(I_{cell})$, and $\beta(T_{cell})$ are impacted with battery cell current and temperature. All of these parameters can be derived from battery test data. In one embodiment in which a Li-ion battery is utilized, the data of $V_{SOC}$, $R_{tran,S}$, $R_{tran,L}$, $C_{tran,S}$, and $C_{tran,L}$ are obtained from experimental results and battery manufacturer specifications, and $\Delta\varepsilon(T_{cell})$, $\alpha(I_{cell})$, and $\beta(T_{cell})$ are obtained in a similar manner.

The current battery model is capable of effectively yielding both the steady-state and transient battery responses that have been observed in Li-ion and other batteries with appropriate parameter inputs. The model has been validated with experimental measurements, and the simulated voltage profiles using the model for a Li-ion battery subjected to periodic pulse discharges and charges matched the experimental Li-ion observations to within 1% except when the accumulated charge level is below 5%. However, it is noted that there is little impact on battery modeling when the battery charge is maintained above 5%, which is outside the range of normal battery operation for PHEVs.

E. Driver Model

The method 500 in one embodiment may be based on a driver model pertaining to control of the vehicle 50. A proportional-integral (PI) control methodology may be provided to manage the gap between the real and targeted vehicle speeds. The driver's wheel torque demand is calculated based on Eq. 5(a); and the pedal signal of acceleration and braking may be estimated based on Eqs. 5(b) and 5(c), respectively; then the pedal signal is delivered to the powertrain integrated control unit in order to meet the demand for the targeted velocity.

$$\tau_{wh,dmd} = F_{tract}R_{wh} + K_P \cdot \Delta V + K_I \cdot \int \Delta V dt \quad (5a)$$

$$\alpha_{accel,dmd} = \begin{cases} \dfrac{\tau_{wh,dmd}}{\tau_{wh,accel_{bdry}}} & \forall (\tau_{wh,dmd} > 0) \cap (\tau_{wh,dmd} < \tau_{wh,accel_{bdry}}) \\ 1 & \forall (\tau_{wh,dmd} > 0) \cap (\tau_{wh,dmd} \geq \tau_{wh,accel_{bdry}}) \end{cases} \quad (5b)$$

$$\alpha_{brk,dmd} = \begin{cases} f_{vrk}(\tau_{wh,dmd}) & \forall (\tau_{wh,dmd} \leq 0) \cap (\tau_{wh,dmd} > \tau_{wh,brk_{bdry}}) \\ -1 & \forall (\tau_{wh,dmd} \leq 0) \cap (\tau_{wh,dmd} \leq \tau_{wh,brk_{bdry}}) \end{cases} \quad (5c)$$

$$\Delta V = V_{target} - V \quad (5d)$$

Figure 16:
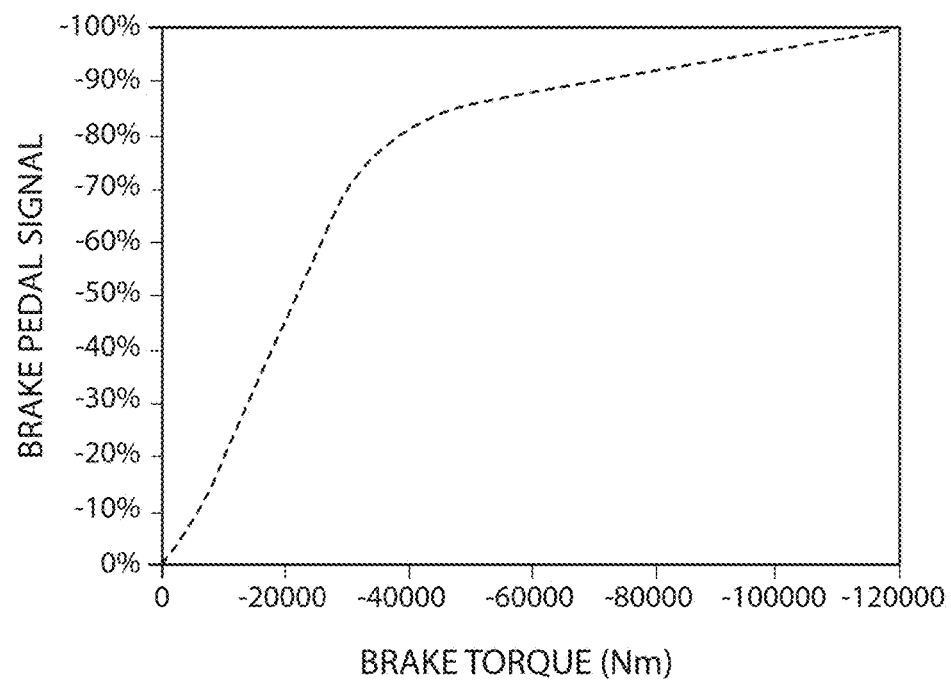
FIG. 16 shows a vehicle pedal braking signal in accordance with one embodiment.

In Eq. 5(a)-5(d), $\alpha_{accel,dmd}$ is acceleration pedal demand; $\alpha_{brk,dmd}$ is braking pedal demand; $\tau_{wh,dmd}$ is vehicle wheel torque demand; $\tau_{wh,accel_{bdry}}$ is vehicle acceleration torque demand boundary, and $\tau_{wh,accel_{bdry}}$ is positive and defined as a nonlinear function of vehicle speed and the selected powertrain, and FIG. 6 shows the curve profile of $\tau_{wh,accel_{bdry}}$ related to the simulated PHEV; $f_{brk}(\tau_{wh,drv})$ is a vehicle braking pedal signal as a function of negative wheel torque demand, as is defined based on the individual vehicle braking system (see FIG. 16 shows the curve profile); $V_{target}$ and V are the targeted and simulated driving vehicle speeds, respectively. The values of Kp and KI are constants for the PI speed control and depend on the driver behavior and the simulated vehicle system; our suggested values are 9000 and 0.5, respectively, for the PHEB. $R_{wh}$ is the effective wheel rolling radius.

F. DDC/CDC Control Based on CEED

In one embodiment, the method 500 may provide an efficiency-driven control mode, where the split torques of engine and motor are dependent vehicle tractive torque (or driver acceleration demand $\alpha_{accel,dmd}$) and battery SOC management strategy for charging CDC, DDC and charge-depletion modes. The engine and motor torque demands are also limited by the operating boundary of engines, motors and batteries. During the acceleration of PHEV, the method 500 may allow the engine propulsion mode 443 (e.g., engine propulsion only), motor propulsion mode 444 (e.g., motor propulsion only mode or PEV mode), and the engine and motor propulsion mode 445 (e.g., a dual mode) within DDC mode. At CDC mode under CS control, the method 500 may allow the engine propulsion and battery charging mode 442, the engine propulsion mode 443, and engine and motor propulsion modes 445. If SOC is above the upper boundary of SOC setup for the CS mode, the method 500 may allow the motor propulsion mode 444. The engine and motor torque demand under each mode may be defined by the constraints below:

---

DDC/CDC Control Method

---

Engine & motor power-split logic algorithm for propulsion
Input: Vehicle tractive torque demand: $\tau_{wh, dmd}$
    final drive efficiency $\eta_{fd}$
    final drive ratio $R_{fd}$
    gearbox efficiency $\eta_{gb}$
    Gearbox ratio $R_{gb}$
    engine efficiency $\eta_{eng}$, $\eta_{eng, chg}$
    engine torque maximum boundary $\tau_{eng, max_{bdry}}$
    engine torque at optimal efficiency $\tau_{eng, opt-eff}$
    motor efficiency $\eta_{mot}$, $\eta_{mot,chg}$
    motor torque acceleration boundary $\tau_{mot, pos_{bdry}}$
    battery SOCs: SOC, $SOC_{lb}$, $SOC_{ub}$
Output: engine and motor torque $\tau_{eng, dmd}$, $\tau_{mot, dmd}$ $\eta_{eng-pwt} = \eta_{fd} \cdot \eta_{gb} \cdot \eta_{eng}$     (6a)
$\eta_{mot-pwt} = \eta_{fd} \cdot \eta_{gb} \cdot \eta_{mot} \cdot \eta_{mot, chg} \cdot \eta_{eng, chg}$     (6b)
If SOC > $SOC_{ub}$ then
    // CD mode
    $\tau_{mot, dmd}$ = min ($\tau_{wh, dmd}/(R_{fd} \cdot R_{gb} \cdot \eta_{fd} \cdot \eta_{gb})$,     (6c)
    $\tau_{mot, pos_{bdry}}$)
    $\tau_{eng, dmd} = 0$     (6d)
Else if mode = CDC then
    // CDC mode under CS mode
    If $\tau_{wh} > \tau_{eng-wh, accel_{bdry}}$ then
    // engine and motor propulsion mode
    $\tau_{mot, dmd}$ = min ($\tau_{wh, dmd}/(R_{fd} \cdot R_{gb} \cdot \eta_{fd} \cdot \eta_{gb})$-     (6e)
    $\tau_{eng, dmd}, \tau_{mot, pos_{bdry}}$)
    $\tau_{eng, dmd} = \tau_{eng, boundary}$     (6f)

-continued

DDC/CDC Control Method

Else
// engine propulsion and battery charging mode
$\tau_{mot,\,dmd} = \tau_{wh,\,dmd}/(R_{fd} \cdot R_{gb} \cdot \eta_{fd} \cdot \eta_{gb})-$ (6g)
$\tau_{eng,\,opt\_eff} \; \forall \; (\tau_{wh,\,dmd} > 0)$
$\tau_{eng,\,dmd} = \tau_{eng,opt\_eff}$ (6h)
End if
Else if mode = DDC then
If $\tau_{wh} > \tau_{mot\text{-}wh,\,accel_{bdry}}$ then
// engine and motor propulsion mode
$\tau_{mot,\,dmd} = \tau_{mot,\,pos_{bdry}}$ (6i)
$\tau_{eng,\,dmd} = \min \; (\tau_{wh,\,dmd}/(R_{fd} \cdot R_{gb} \cdot \eta_{fd} \cdot \eta_{gb})-$ (6j)
$\tau_{mot,\,dmd},\tau_{eng,\,boundary}) \; \forall \; (\tau_{wh,\,dmd} > 0)$
Else
If $\eta_{eng\text{-}pwt} \geq \eta_{mot\text{-}pwt}$ then
// engine propulsion only mode
$\tau_{mot,\,dmd} = 0$ (6k)
$\tau_{eng,\,dmd} = \min(\tau_{wh,\,dmd}/(R_{fd} \cdot R_{gb} \cdot \eta_{fd} \cdot \eta_{gb}),$ (6l)
$\tau_{eng,\,boundary}) \; \forall \; (\tau_{wh,\,dmd} > 0)$
Else
// engine propulsion only mode
$\tau_{mot,\,dmd} = \min \; (\tau_{wh,\,dmd}/(R_{fd} \cdot R_{gb} \cdot \eta_{fd} \cdot$ (6m)
$\eta_{gb}),\tau_{mot,pos_{bdry}}) \; \forall \; (\tau_{wh,dmd} > 0)$
$\tau_{eng,dmd} = 0$ (6n)
End if
End if In one embodiment, during vehicle braking, the braking torque and motor regenerative torque demands are limited by the constraints of the regenerative conditions, as well as motor and battery operation boundaries, as given below. Both the motor regenerative and braking torque demands are negative during vehicle braking.

$$\tau_{mot,dmd} = \tag{7a}$$
$$\begin{cases} \tau_{wh,regen_{bdry}} / (R_{fd} \cdot R_{gb}) & \forall \left(\tau_{wh,dmd} \leq \tau_{wh,regen_{bdry}}\right) \cap (\tau_{wh,dmd} \leq 0) \\ \tau_{wh,dmd} / (R_{fd} \cdot R_{gb}) & \forall \left(\tau_{wh,dmd} > \tau_{wh,regen_{bdry}}\right) \cap (\tau_{wh,dmd} \leq 0) \end{cases}$$

$$\tau_{brk,dmd} = \tag{7b}$$
$$\begin{cases} \tau_{wh,dmd} - \tau_{wh,regen_{bdry}} & \forall \left(\tau_{wh,dmd} \leq \tau_{wh,regen_{bdry}}\right) \cap (\tau_{wh,dmd} \leq 0) \\ 0 & \forall \left(\tau_{wh,dmd} > \tau_{wh,regen_{bdry}}\right) \cap (\tau_{wh,dmd} \leq 0) \end{cases}$$

and $$\tau_{wh,regen_{bdry}} = \tag{7c}$$
$$\max\left(\tau_{mot,regen_{bdry}}, \frac{W_{batt,chg_{bdry}} + W_{accelec}}{\omega_{mot}}, \frac{\alpha_{brk,drv} \cdot |\tau_{wh,brk_{bdry}}| \cdot \delta_{dec}}{R_{fd} \cdot R_{gb}}\right)$$
$$R_{fd} R_{gb} \; \forall \; (\tau_{wh,dmd} < 0)$$

where $\tau_{wh,regen_{bdry}} = \tau_{mot,neg_{bdry}} \cdot R_{fd} \cdot R_{gb}$; $W_{batt,chg_{bdry}}$ and $W_{batt,dischg_{bdry}}$ are the battery charging and discharging power boundary, respectively; $R_{fd}$ is final drive ratio; $R_{gb}$ is transmission gear ratio; $\delta_{dec}$ is a factor that considers the constraints during brake regeneration. Energy regeneration from braking is assumed to occur when the vehicle deceleration has not exceeded a threshold (i.e., deceleration <−2 m/s²). The constraints are used to distinguish vehicle emergency braking from regenerative kinetic energy and avoid very low kinetic energy regeneration. $W_{accelec}$ is the electric accessory load, which is taken to be constant.

In one embodiment, a mode of operation includes charging the battery at full stops when SOC<$SOC_{parking\;charge}$, the method 500 may allow engine charging of the battery only. The engine and motor torque demand is defined by the constraints below:

$$\tau_{eng} = \tau_{eng,max\_eff} \tag{8a}$$

$$\tau_{mot} = -\tau_{eng} \tag{8b}$$

G. Powertrain Model

The method 500 in one embodiment may be based on models for the torque and speed of the wheels 40A, 40B, final drive (e.g., differential 32), the transmission 30, and the clutch 26 delivered from the engine 24 and the motor 14, and are given as follows:

$$\omega_{wh} = V/R_{wh} \tag{9a}$$

$$\omega_{wh} \cdot R_{fd} = \omega_{fd} \tag{9b}$$

$$\omega_{fd} \cdot R_{gb} = \omega_{gb} = \omega_{mot} \tag{9c}$$

$$\omega_{gb} \cdot R_{gb} = \omega_{mot} = \omega_{cpl\_ds} \tag{9d}$$

$$\tau_{wh,dmd} = \tau_{fd,dmd} \cdot \eta_{fd} \cdot R_{fd} \tag{9e}$$

$$\tau_{fd,dmd} = \tau_{gb,dmd} \cdot \eta_{gd} \cdot R_{gb} \tag{9f}$$

$$\tau_{gb,dmd} = \tau_{mot,dmd} + \tau_{cpl\_ds,dmd} \tag{9g}$$

In Eq. 9, $\eta_{gb}$ and $\eta_{fd}$ are transmission and final drive efficiencies; $\omega_{wh}$, $\omega_{fd}$, $\omega_{gb}$, $\omega_{mot}$ and $\omega_{cpl\_ds}$, are the speeds of the wheel 40A-B, final drive (e.g., differential 32), the transmission 30, the motor 14 and the clutch 26 downstream part; $R_{wh}$ is wheel radius; $R_{fd}$, and $R_{gb}$ are the ratio of the final drive and the transmission 30; $\tau_{wh,dmd}$, $\tau_{fd,dmd}$, $\tau_{gb,dmd}$, $\tau_{mot,dmd}$ and $\tau_{cpl\_ds,dmd}$ are the torque demands of wheel 40A-B, the final drive, the transmission 30, the motor 24 and the clutch 26 downstream component.

Because the clutch 26 provides a coupling from the engine crankshaft to the transmission 30, it is modeled as two separate rigid components when the coupling is unlocked and treated as one rigid component when the coupling is locked. To the operation process, an abridged clutch logic is adopted in the model, i.e., the clutch is locked if engine speed reaches a given starting speed; otherwise, it is unlocked.

When it is locked, the speed and torque of the connected engine 24, the clutch 26, and the transmission 30 are given as below:

$$\omega_{eng} = \omega_{cpl\_us} = \omega_{cpl\_ds} = \omega_{gb} \tag{10a}$$

$$\tau_{eng,dmd} = \tau_{cpl\_us,dmd} = \tau_{cpl\_ds,dmd} = \tau_{gb,dmd} \tag{10b}$$

If the clutch is unlocked, the speed and torque of the connected engine 24, the clutch 26 and the gearbox (e.g., transmission 30) are described as follows:

$$\omega_{eng} = \omega_{cpl\_us} = 0 \text{ and } \omega_{cpl\_ds} = \omega_{gb} \tag{10c}$$

$$\tau_{eng,dmd} = \tau_{cpl\_us,dmd} = \tau_{cpl\_ds,dmd} = 0 \tag{10d}$$

In Eq. 10, $\omega_{eng}$ and $\omega_{cpl\_up}$ are the speeds of the engine 24 and the clutch 26 upstream component; $\tau_{end,dmd}$ and $\tau_{cpl\_us,dmd}$ are the torque demands of the engine 24 and the clutch 26 upstream component.

The transmission gear control and shifting in the Eqs. 9-10 are involved in algorithms which consider powertrain efficiency and vehicle drivability. The transmission shift control is detailed in the Gearbox shift logic algorithm listed below.

TABLE 3

Transmission Control Methodology

Gearbox shift logic algorithm
Input: gearbox current gear number $N_{gb,\ curr}$,
  gearbox next up gear number $N_{gb,\ nextup}$,
  gearbox next down gear number $N_{gb,\ nextdn}$,
  driver acceleration demand $\alpha_{accel,\ drv}$,
  gearbox inlet speed $\omega_{gb,\ in}$,
  gearbox max inlet speed $\omega_{gb,\ max}$,
  gearbox min inlet speed $\omega_{gb,\ min}$,
  gearbox shifting time $\Delta t_{shift} = 1$,
  max driver acceleration demand without shifting time $\alpha_{wst} = 0.5$
Output: Gearbox demand gear number $N_{gb,\ dmd}$ $\Delta t = t - t_0$
$\omega_{gb,\ in,\ nextup} = V_{drv}/R_{wh} * R_{fd} * R_{gb}(N_{gb,\ nextup})$
$\omega_{gb,\ in,\ nextdn} = V_{drv}/R_{wh} * R_{fd} * R_{gb}(N_{gb,\ nextdn})$
If $\omega_{gb,\ in} > \omega_{gb,\ max}$ & $N_{gb,\ curr} < N_{gb,\ max}$ then
  $N_{gb,dmd} = N_{gb,\ curr} + 1$
Else if $\omega_{gb,\ in,\ nextup} > \omega_{gb,\ min}$ & $N_{gb,\ nextup} > N_{gb,\ curr}$ then
  If $\alpha_{accel,\ dmd} < \alpha_{accel,\ wst}$ then
    $N_{gb,\ dmd} = N_{gb,\ curr} + 1$
  Else
    If $\Delta t > \Delta t_{shift}$ then
      $N_{gb,\ dmd} = N_{gb,\ curr} + 1$
    End if
  End if
Else if $\omega_{gb,\ in} < \omega_{gb,\ min}$ & $N_{gb,\ curr} > 1$ then
  $N_{gb,\ dmd} = N_{gb,\ curr} - 1$
Else if $\omega_{gb,\ in,\ nextdn} < \omega_{gb,\ max}$ & $N_{gb,\ nextdn} < N_{gb,\ curr}$ then
  If $\alpha_{accel,\ dmd} < \alpha_{accel,\ wst}$ then
    $N_{gb,\ dmd} = N_{gb,\ curr} - 1$
  Else
    If $\Delta t > \Delta t_{shift}$ then
      $N_{gb,\ dmd} = N_{gb,\ curr} - 1$
    End if
  End if
End if
If $N_{gb,\ dmd} \neq N_{gb,\ curr}$ & $\Delta t \geq 0.5\Delta t_{shift}$ then
  $N_{gb,\ dmd} = N_{gb,\ dmd}$
Else
  $N_{gb,\ dms} = N_{gb,\ curr}$
End if In the above gearbox shift logic algorithm, $N_{gb,nextup}$ and $N_{gb,nextdn}$ are determined based on the optimal transmission gear selection plotted in FIGS. 8 and 9A-C which is based on optimal engine-based powertrain efficiency, and in FIG. 11 which is based on optimal motor-based powertrain efficiency.

$$N_{gb,nextup} = \begin{cases} N_{gbmap\_nextup\_eng-opt}(\alpha_{accel,dmd}, V_{drv}) & \forall (S_{eng,st} = 1, \text{i.e. eng\_on}) \\ N_{gbmap\_nextup\_mot-opt}(\alpha_{accel,dmd}, V_{drv}) & \forall (S_{eng,st} = 0, \text{i.e. eng\_off}) \end{cases} \quad (11a)$$

$$N_{gb,nextdn} = \begin{cases} N_{gbmap\_nextdn\_eng-opt}(\alpha_{accel,dmd}, V_{drv}) & \forall (S_{eng,st} = 1, \text{i.e. eng\_on}) \\ N_{gbmap\_nextdn\_mot-opt}(\alpha_{accel,dmd}, V_{drv}) & \forall (S_{eng,st} = 0, \text{i.e. eng\_off}) \end{cases} \quad (11b)$$

The optimal torque demand of engine and motor in Eqs. 9-10 are involved in algorithms which consider powertrain efficiency and vehicle drivability. The transmission shift control is detailed in the gearbox shift logic algorithm as listed below.

The forward-looking driving speed of the vehicle may be calculated based on the following equation.

$$\frac{dV_{drv}}{dt} = \frac{\tau_{wh,dmd}}{(m + I_{tot}/R_{wh}^2) \cdot R_{wh}} - \quad (12)$$

$$\frac{1}{(m + I_{tot}/R_{wh}^2)}\left(\frac{1}{2}\rho C_d A_f V_{drv}^2 + mgC_{rr}\cos\theta + mg\sin\theta\right) +$$

$$\frac{\tau_{brk,drv}}{(m + I_{tot}/R_{wh}^2) \cdot R_{wh}}$$

In Eq. 11, $I_{tot}$ addresses the total inertia of powertrain, which is given as below:

$$I_{tot} = (((I_{mot} + I_{cpl} + I_{eng}) \cdot R_{gb} + I_{gb}) \cdot R_{fd} + I_{fd}) + n_{wh} \cdot I_{wh} \quad (13)$$

In Eq. 13, $I_{mot}$, $I_{cpl}$, $I_{eng}$, $I_{fd}$, and $I_{wh}$ are the inertia of the motor 14, the clutch 26, the engine 24, final drive and wheel 40A-B, respectively; $n_{wh}$ is the number of vehicle wheels 40A-b.

H. Model Validation

To confirm that the powertrain model provides reasonable simulation results, the proposed efficiency-driven control strategy for the method 500 was replaced with a conventional Autonomie powertrain control strategy. In the conventional Autonomie controller, the demanded engine torque is determined based on the linear function of requested tractive load, motor load (including battery charging and vehicle propulsion), and accessory load. It does not consider the powertrain and component efficiency optimization. The details are addressed in Autonomie software—which is incorporated by reference herein in its entirety. The model as modified to implement the conventional Autonomie strategy is used as a baseline and to simulate a Class 7 regular hybrid bus over various city bus drive cycles, i.e., the Central Business District (CBD) cycle, Manhattan bus cycle (MAN), New York bus (NYBC) cycle, Orange County Transit Authority (OCTA) bus cycle, Washington Metropolitan Area Transit Authority (WMATA) cycle, and Knoxville Area Transit (KAT) cycle. In the simulations, the hybrid vehicle is propelled by a 6.2 L diesel engine, 6-speed automatic transmission, and a 120 kW Motor while using a 20 kWh battery with a charge sustaining control strategy available from Autonomie. The gross vehicle weight is assumed to be 11,836 kg. The model as modified to implement the conventional Autonomie strategy predicted Manhattan bus cycle fuel economy as 2.25 km/L compared to 2.21 km/L predicted by a separate Autonomie simulation. This indicates that the model is capable of predicting the hybrid electric vehicle performance with reasonable accuracy, and that simulation results obtained with the model implementing the method 500 as described herein are likely to be accurate.

IV. Powertrain Simulation

A. Driving Cycles

To obtain simulation results, a typical driving cycle may be selected using on-road measurement data. The cycles selected include road grades determined from elevation lookup of GPS location data. The bus case is a city driving cycle covering 5800 s and 35.0 km in length. The basic driving characteristics include the maximum speed of 66 km/hr, average speed of 21.7 km/hr, maximum acceleration of 1.66 m/s², and maximum deceleration of -2.03 m/s²

B. Charge Sustaining Mode Using DDC/CDC Control

Figure 17:
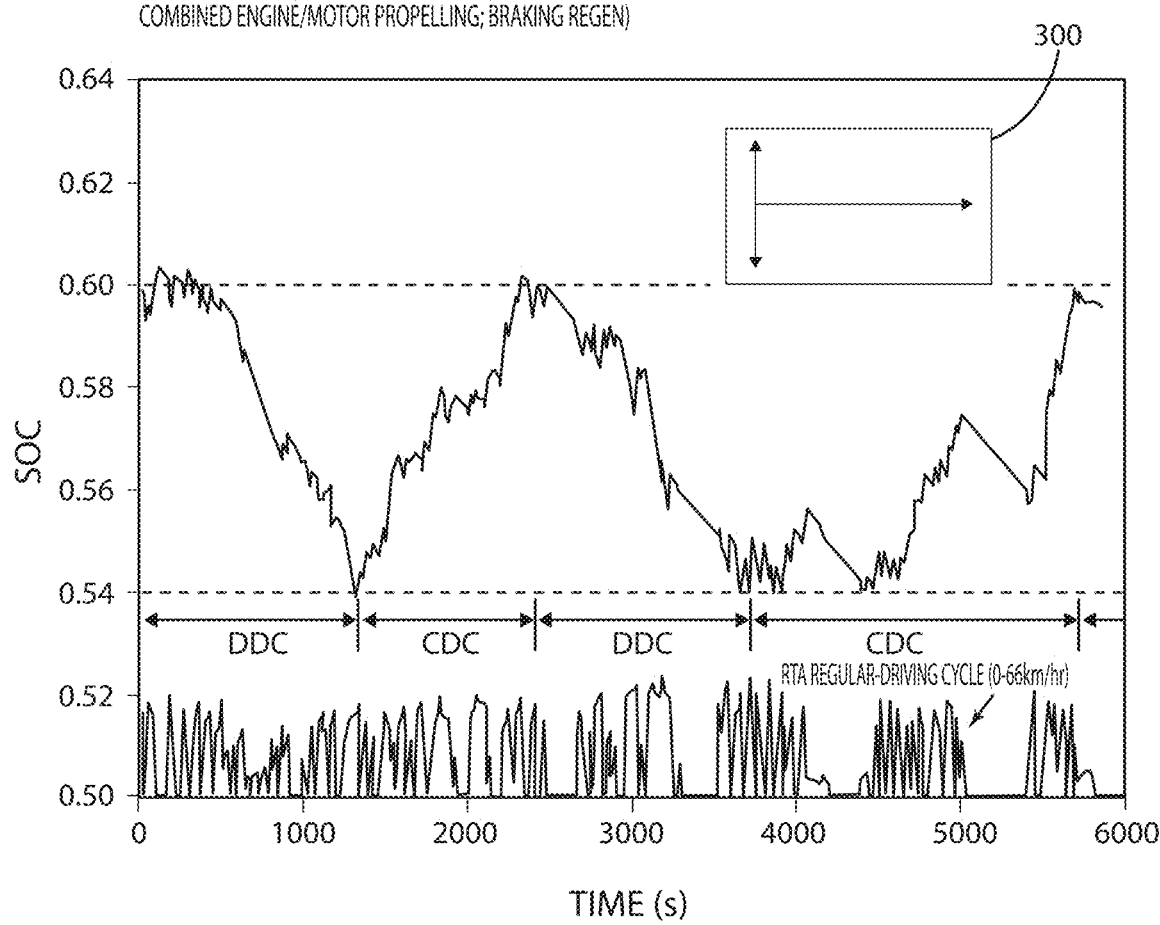
FIG. 17 shows a SOC profile of a charge sustaining mode using DDC/CDC over a bus regular-driving cycle in accordance with one embodiment.
Figure 18A:
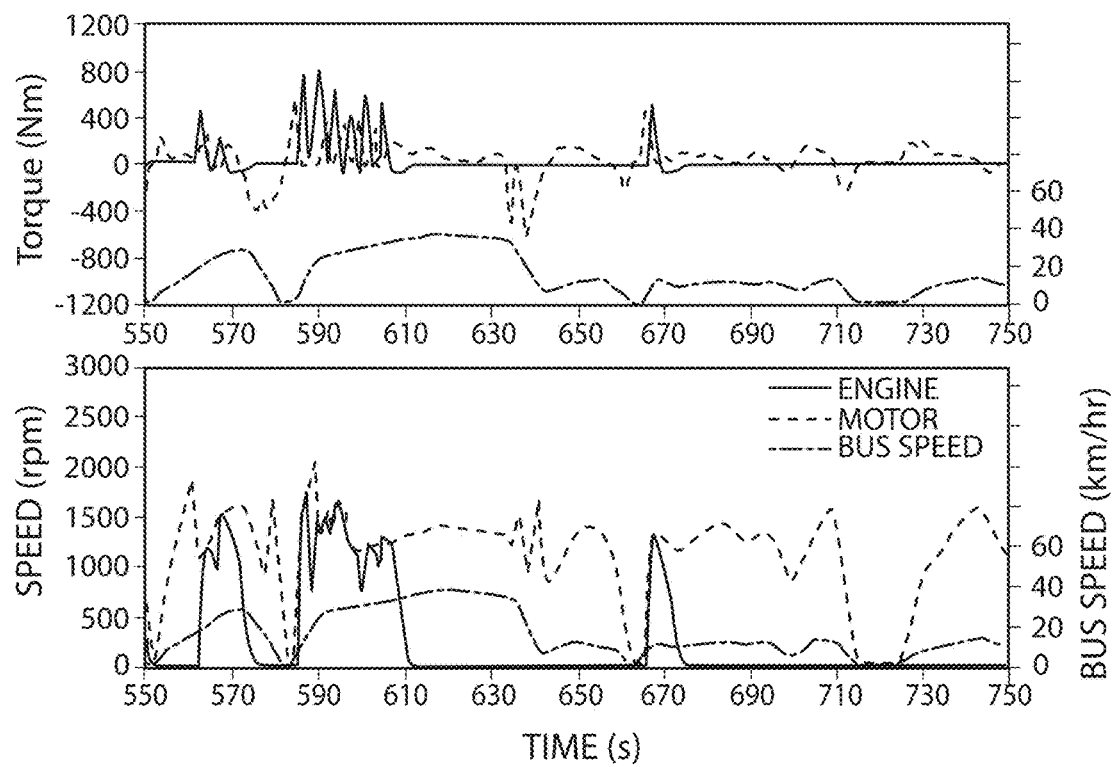
FIGS. 18A-B show a simulated bus charge sustaining mode with DDC and CDC control in accordance with one embodiment.
Figure 18B:
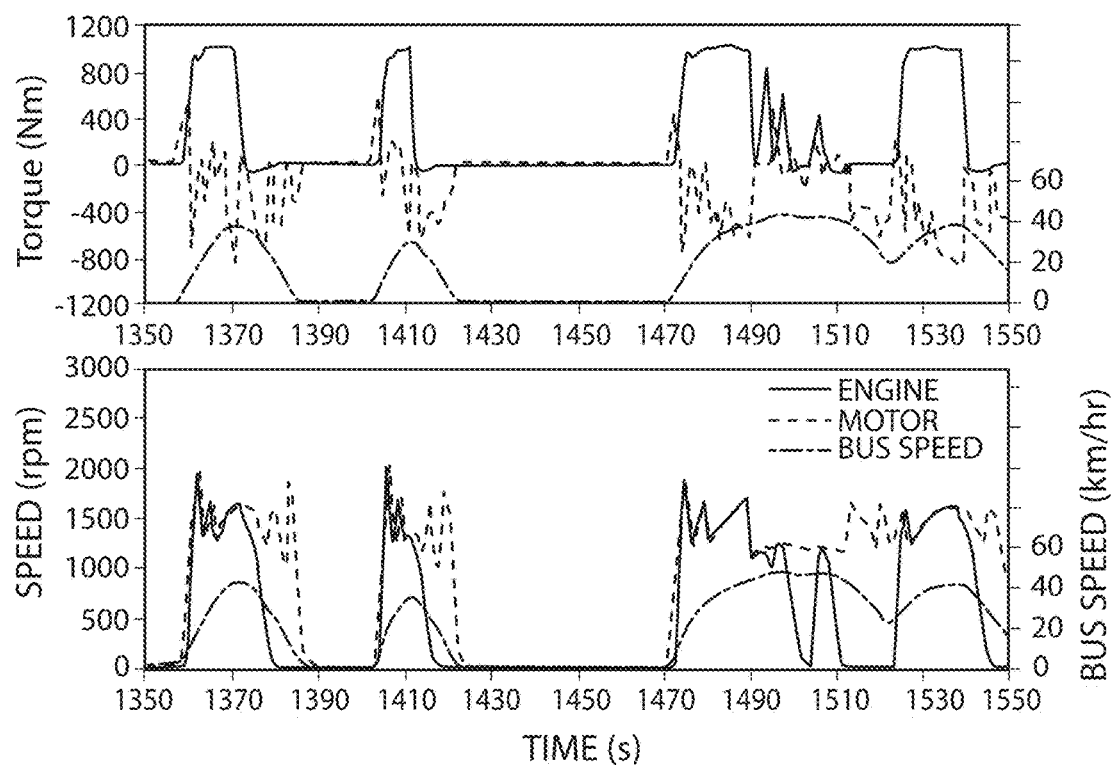

A bus charge sustaining operation mode according to one embodiment has been simulated over the bus regular-driving cycle. A baseline parallel hybrid electrical bus can be used as a comparison and may include a conventional "built-in" charge sustaining control strategy adopted from conventional powertrain software. FIG. 17 shows the SOC profile of the charge sustaining operation of the bus over the bus regular-driving cycle. In the simulation, the upper and lower boundaries of SOC management are 0.6 and 0.54. The DDC/CDC powertrain control according to one embodiment may enable the system 100 to flexibly deliver engine power by maximizing its efficiency between the upper and lower boundaries while substantially avoiding any negative and unexpected situation to any driving conditions. FIGS. 18A-B show examples of the engine and motor performance when the controller 118 runs at DDC and CDC. For the performance of DDC mode shown in FIG. 18A, the motor 14 provides power when the bus starts from a stop at 552 s. At the low speed and low power demand, the motor 14 has better efficiency than the engine 24. After ten seconds, the bus tractive power demand increases with bus speed and acceleration. Thus the DDC control strategy in accordance with one embodiment commands the engine 24 on to propel the bus together with the motor 14. During the period between 574 s and 582 s, the bus decelerates to a full stop so that the engine 24 is off and the braking energy is recovered by the motor 14 to charge the battery 10. The bus reaccelerates between 582 s and 590 s, and the acceleration is higher than at 550 s. At the low speed (i.e., 582 s-585 s), the control method according to one embodiment commands the motor 14 to propel the bus. At 585s, the engine 24 is commanded to propel the bus while the motor torque is zero. The engine 24 remains on until 610 s. During the period, the engine and motor torque propel the bus alternatively based on which efficiency is better. For the period between 612 s and 662 s, the bus runs at cruise and deceleration, which represents low tractive power demand. Thus the engine 24 turns off, and the motor 14 propels the bus. From FIGS. 18A-B, the motor 14 may only propel the bus over the period of 674 s-750 s, as the bus speed and acceleration are lower. FIG. 8A shows DDC control in accordance with one embodiment providing efficient operation in propelling the simulated bus.

The detailed performance of CDC mode in one embodiment is shown in FIG. 8B. The engine propulsion and battery charging mode may be dominant in the CDC mode. The engine only and engine and motor propulsion modes do not appear in this short segment including low speeds and accelerations.

Figure 19A:
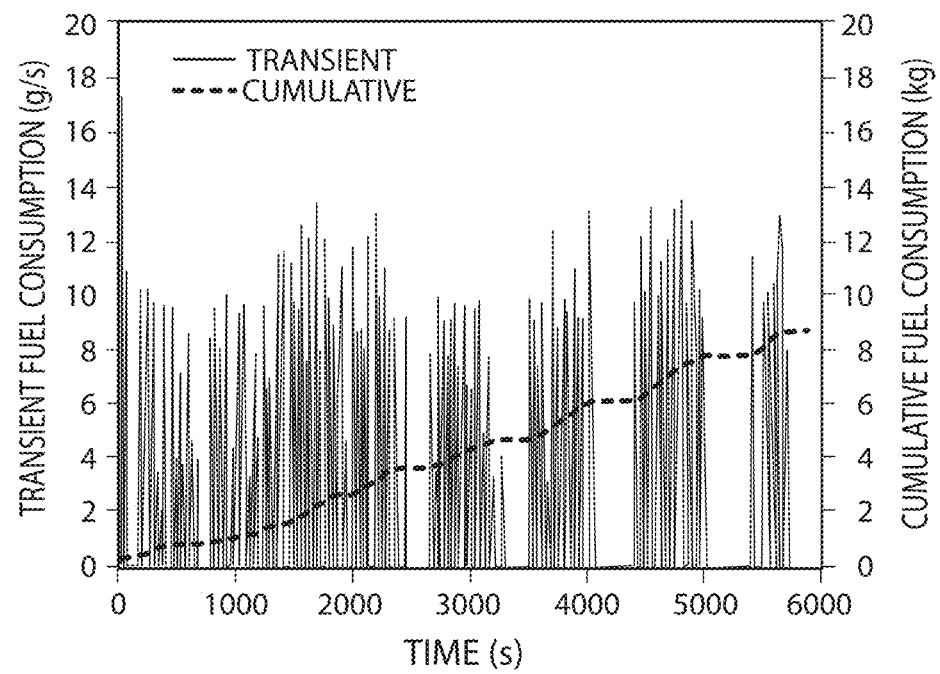
FIGS. 19A-B show a comparison of fuel consumption between DDC/CDC powertrain control according to one embodiment and a conventional control strategy under a bus charge sustaining control mode.
Figure 19B:
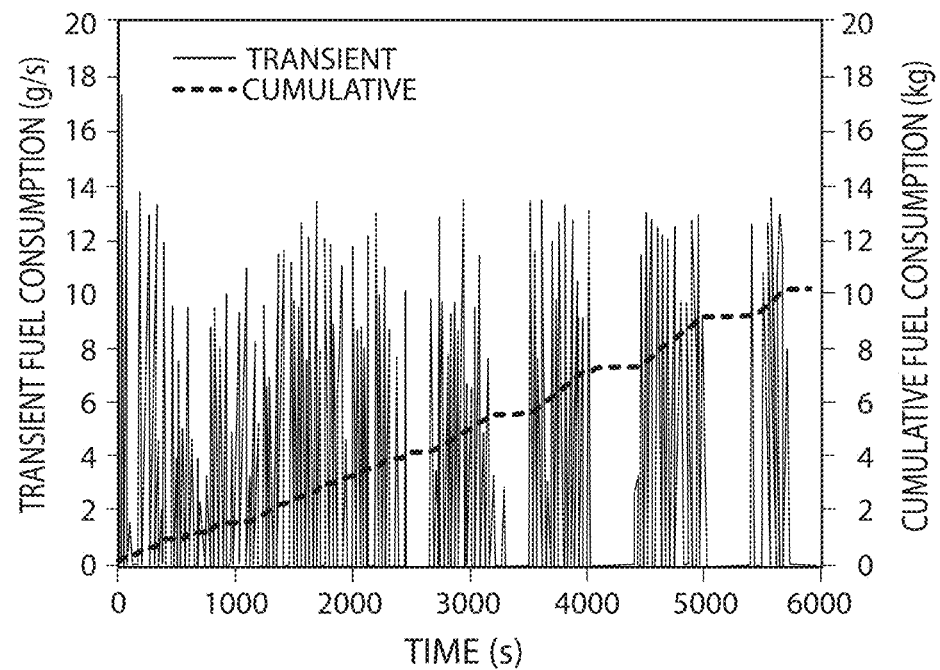
Figure 20A:
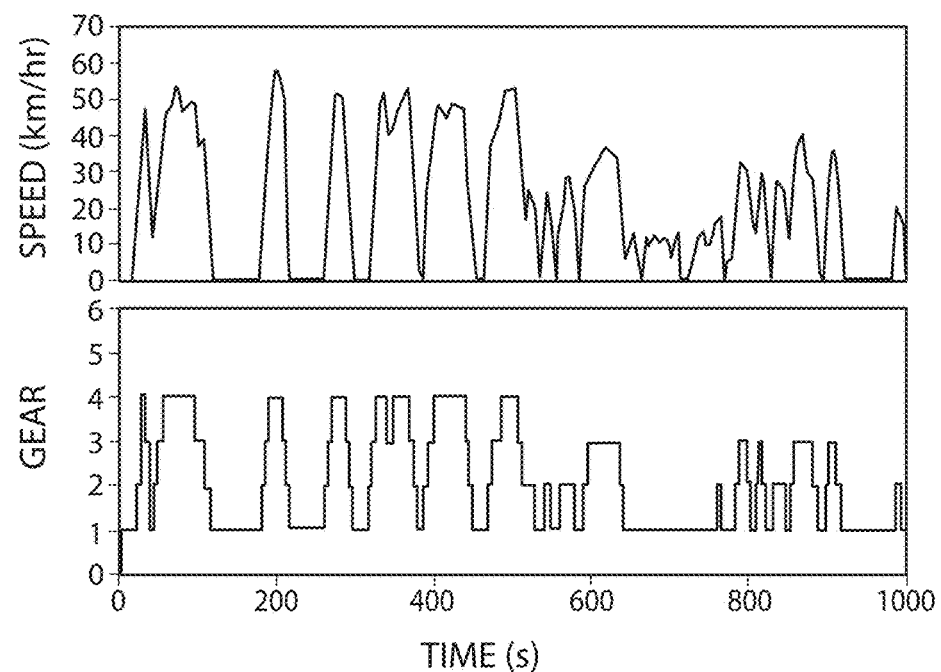
FIGS. 20A-B show a comparison of gear selection between DDC/CDC powertrain control according to one embodiment and a conventional control under a bush charge sustaining control mode.
Figure 20B:
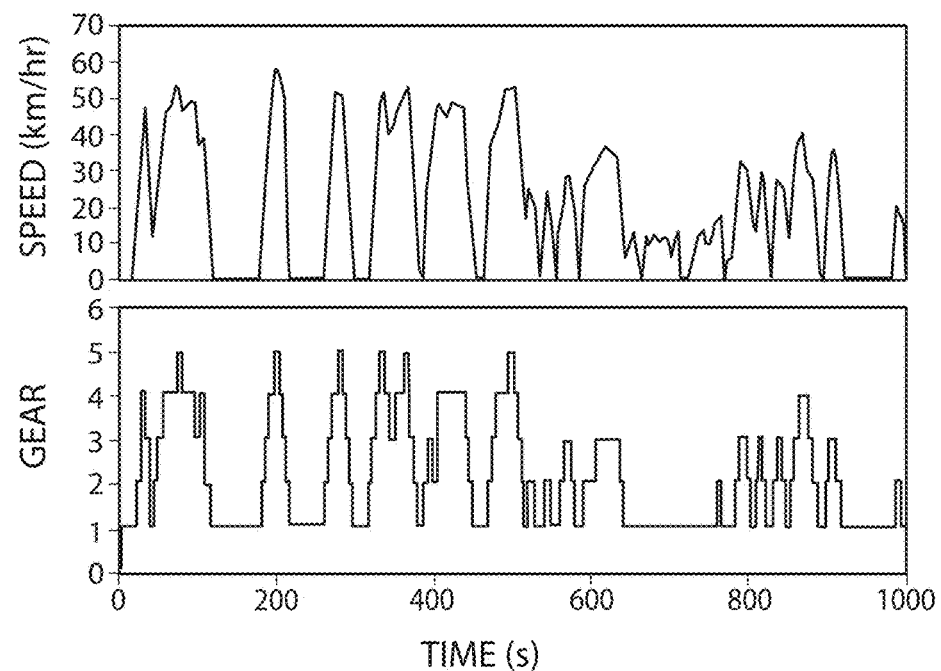

FIGS. 19A-B show that the powertrain control method according to one embodiment may achieve 10.4% fuel consumption savings vs. a conventional baseline simulation for a hybrid bus. The fuel economy using the control method in one embodiment may achieve 3.43 km/L compared to 3.07 km/L for the conventional hybrid bus case. The predicted cycle-average engine efficiency is 38.3% compared to 35.4% in the conventional hybrid bus case. The predicted cycle-average motor efficiency is 86.2% compared to 83.2% in the conventional hybrid bus case. Thus the control strategy in one embodiment may enhance both engine and motor efficiency significantly relative to conventional implementations. Additionally, the results show smooth gear upshifting and downshifting for the control method according to one embodiment. For instance, as can be seen in FIGS. 20A-B, compared to conventional control strategies, such as the conventional strategy from Autonomoie, gear upshifting/downshifting operation according to one embodiment of the present disclosure is smoother.

C. Vehicle Performance with Full Battery Charge

Figure 21A:
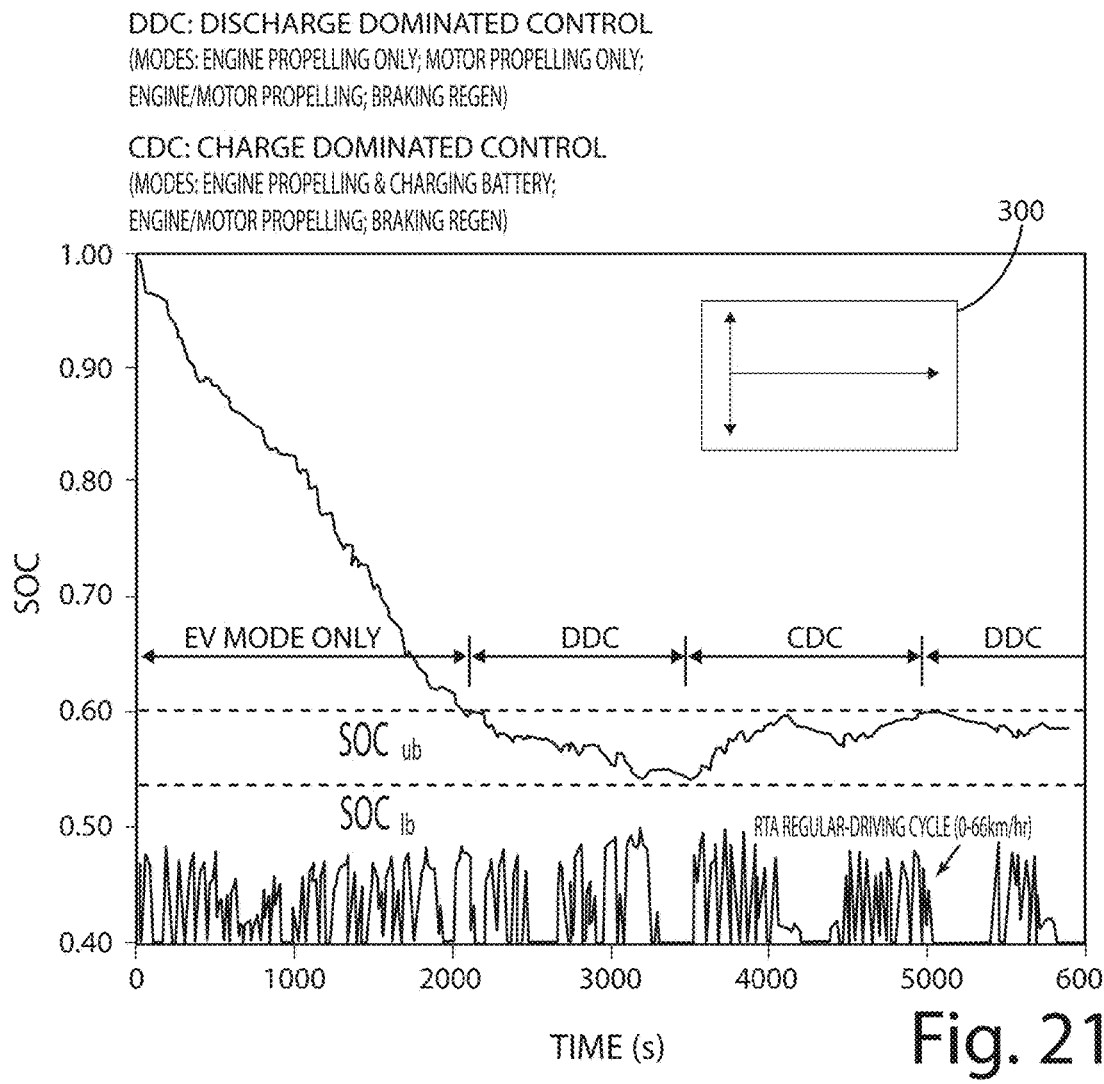
FIGS. 21A-B show vehicle performance with a full charged battery of a bus regular-driving cycle in accordance with one embodiment of the present disclosure.
Figure 21B:
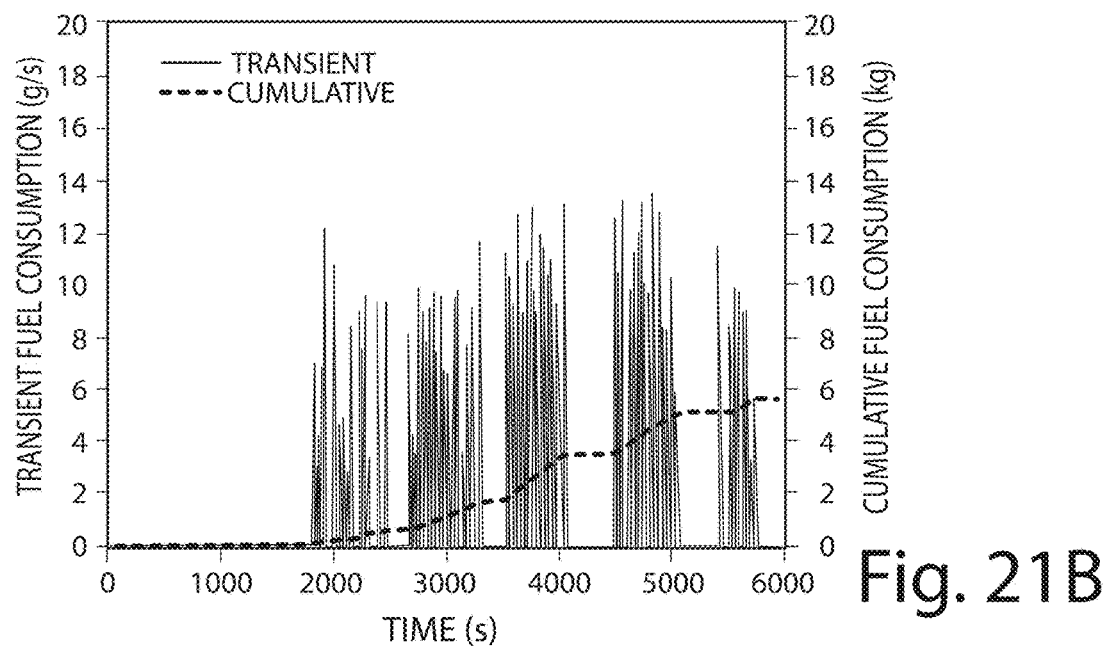

In the case of a vehicle with full battery charge (i.e., the initial battery SOC is 1.0), vehicle operation has been simulated over the bus regular-driving cycle. FIGS. 21A-B show the SOC profile of vehicle operation. The fuel economy of the vehicle with a fully charged battery may enable a significant portion of plug-in electric vehicle (PEV) mode operation. The results show that the first 13.8 km is driven in PEV mode, followed by 21.2 km running in the charge-sustaining modes: DDC and CDC. The method in one embodiment of the present disclosure achieves 5.21 km/L for the bus regular driving cycle, which represents a 34.4% reduction in fuel consumption compared to the simulated charge sustaining mode shown in FIG. 17. The cycle-average efficiencies of the engine 24 and the motor 14 are 38.5% and 86.0%, respectively, with the method according to one embodiment for the vehicle.

D. Impact of Eco-Driving on the Vehicle

The impact of eco-driving according to one embodiment of the present disclosure is demonstrated based on two cases simulated over a bus eco-drive cycle developed to represent a highly optimized speed control system. The first case is vehicle charge sustaining operation with optimized powertrain control over the bus eco-drive cycle. The simulated fuel economy is 4.55 km/L. This represents a 24.6% energy saving relative to the same vehicle (operating according to a method of the present disclosure) over the regular drive cycle and a 32.4% energy saving relative to a conventional hybrid bus without the optimized powertrain control operating over the regular drive cycle. This indicates that an additional 7.8% fuel savings can be realized relative to that achieved from the eco-driving cycle by itself without optimized powertrain control. The cycle-average engine efficiency under a method according to one embodiment is 38.8% for the bus eco-drive cycle, which is slightly higher than the 38.3% efficiency for the bus regular drive cycle. The cycle-average motor efficiency under a method according to one embodiment is 85.3% for the bus eco-drive cycle, which is slightly less than the 86.2% efficiency for the bus normal drive cycle.

For the hybrid mode with a fully charged battery which enables a significant portion of the all-electric (PEV) operating mode, the simulated fuel economy is 7.95 km/L over the bus eco-drive cycle, indicating that the eco-driving can also boost vehicle fuel economy considerably as compared to regular-driving.

A simulation employing an eco-drive cycle to represent connected and autonomous (CAV) enabled speed optimizations may be used to estimate the eco-driving benefits on fuel consumption. The results indicate energy savings of 24.6% while using the method of one embodiment in the charge sustaining mode application for the bus normal drive cycle. The method in one embodiment may achieve a fuel efficiency of 5.27 km/L over the bus eco-drive cycle.

PHEV mode with a fully charged battery, which enables a significant portion of the all-electric (PEV) operating mode, yields 5.23 km/L over the bus regular-driving cycle and reduces 34.4% of fuel consumption compared to the simulated charge sustaining mode for the optimized powertrain without PHEV operation. Eco-driving can even enlarge the fuel saving of the hybrid mode, as the simulated fuel economy is 7.95 km/L over the regular eco-drive cycle.

In one embodiment, simulation times for the 6000 s drive cycle can be performed in around 10 minutes of CPU time in a desktop computer having 16.0 GB memory and an Intel® Xeon® CPU E5-2630@2.30 GHz (2 processors). This indicates that a method according to one embodiment may be used for real time control.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A system for controlling a powertrain of a vehicle, wherein the powertrain of the vehicle has a parallel hybrid configuration using an engine power source and an electric motor power source and battery system, wherein the engine power source forms part of an engine-driven powertrain of the vehicle, wherein the electric motor power source forms part of a motor-driven powertrain, wherein the engine and motor power sources form part of a combined engine and motor powertrain, the system comprising:
   a supervisory controller; and
   a database memory including a database of information, the database memory communicatively coupled with the supervisory controller, the database memory configured to store information on predetermined overall optimal engine-driven or motor-driven or combined engine and motor powertrain efficiency maps;
   wherein engine-driven powertrain efficiency is defined as overall operating efficiencies of a final drive, a transmission, and the engine power source;
   wherein motor-driven powertrain efficiency is defined as overall operating efficiencies of the final drive, the transmission, the electric motor power source, battery, and the engine power source for battery charging;
   wherein a set of optimal operation maps is provided for a combined engine and motor powertrain operation state in a power split mode during which both the engine power source and the electric motor power source propel the vehicle under heavy load conditions;
   wherein a set of optimal operation maps is provided for the combined engine and generator powertrain operation state during periods of opportunistic battery charging when the vehicle is at light loads or idling;
   wherein the database memory characterizes an operating envelope of wheel torque available for the vehicle at each speed level over an entire potential range of driving conditions that include vehicle weight and road grade;
   wherein the operating envelope is based on an available power output, an available torque output, and an available speed output from both the engine power source and the electric motor power source;
   wherein the database memory includes constraints corresponding to an operation state of the engine-driven powertrain and the motor-driven powertrain, and to concurrent operation state of the combined engine and electric motor powertrain;
   wherein the database memory includes optimal transmission gear maps that include an optimal transmission gear selection map for the optimal motor-driven powertrain efficiency map and an optimal transmission gear selection map for optimal engine-driven powertrain efficiency map, wherein the optimal transmission gear selection map for the optimal motor-driven powertrain efficiency map and the optimal engine-driven powertrain efficiency map are different; and
   wherein the supervisory controller is configured to determine, based at least in part on the information stored in the database memory, operations to be performed by the engine-driven powertrain, the motor-driven powertrain, and concurrent operation of the engine-driven powertrain and motor-driven powertrain to maximize efficiency of the powertrain of the vehicle.

2. The system of claim 1, wherein, to determine the operations of achieving charge-depletion (CD) control and charge-sustaining (CS) control, the supervisory controller is configured to manage battery state-of-charge (SOC) via multiple powertrain operation states under CS control which consists of charge-dominant control (CDC) and discharge-dominant control (DDC) operating regimes and optimally select a final powertrain operation state by considering optimal gear selection and transmission shifting to maximize the inherent optimal efficiency of the entire powertrain in each mode considered in CDC or DDC.

3. The system of claim 2, the supervisory wherein the controller regulates the SOC level to elaborate complex powertrain operation consisting of (1) six propulsion modes at CS control and (2) two propulsion modes at CD control.

4. The system of claim 3, wherein the CS control consists of motor propulsion only, engine propulsion only, engine propulsion with battery charging, combined engine and motor propulsion (power split mode), battery charging only, and regenerative braking, wherein the six propulsion modes in the CS control are regrouped into DDC and CDC operating regimes to reduce engine on/off frequency and to ensure smooth gear shifting for non-freeway MD/HD hybrid vehicles;
   wherein during a DDC operating regime, the vehicle runs an engine propulsion mode, a motor propulsion mode, and a combined motor and engine propulsion mode based on powertrain efficiency and load demand;
   wherein the supervisory controller is configured to maximize the use of electrical energy during the DDC operating regime;
   wherein the supervisory controller is configured to compare optimal motor-driven powertrain efficiency and optimal engine-driven powertrain efficiency, based on predetermined information, to optimally determine an energy-saving propulsion mode selection;
   wherein the optimal motor-driven powertrain efficiency is estimated by taking the combined efficiency of the final drive, the transmission, drive to wheels of the vehicle, the battery, and charging of the battery;

wherein the optimal engine-driven powertrain efficiency is estimated by taking the combined efficiency of the final drive, the transmission, and the engine power source;

wherein after the wheel torque demand exceeds a wheel torque boundary enabled with motor-only propulsion, the supervisory controller runs the combined motor and engine propulsion mode, in which the full-load electric motor power source propels the vehicle with assistance of the engine power source buffering extra-power demand, whereby the supervisory controller enables maximizing motor efficiencies while minimizing engine frequent on and off;

wherein CDC mode allows the engine on longer because engine propelling and battery charging are dominated in the CDC mode, wherein, during the CDC mode, the vehicle employs the engine propulsion mode, engine propulsion and charging mode, combined engine and motor propulsion mode, and motor propulsion mode;

wherein, in the CDC mode, the vehicle is configured to preferentially run the engine at the optimal efficiency, based on the predetermined information, for propelling the vehicle with or without battery charging, wherein, the supervisory controller allows running the engine at optimal efficiency at a given engine speed to charge the battery while a portion of the engine power source is used to propel the vehicle, wherein if the wheel torque demand is higher than that enabled with engine power at the optimal efficiency, then control is switched to the mode of engine propulsion only without battery charging; and wherein after the wheel torque demand exceeds the wheel torque boundary enabled with engine propulsion only, the supervisory controller runs the combined engine and motor propulsion mode in which the full-load engine power source propels the vehicle with the assistance of the electric motor power source buffering extra-power demand, which is different from the combined motor and engine propulsion demand under DDC, wherein the motor propulsion mode during CDC is also adopted to meet low-load demand during CDC, such that engine efficiencies are maximized to avoid frequent engine on/off and low efficiency operations due to low load demand.

5. The system of claim 2, based on upper and lower boundaries of SOC management for CS control, the supervisory controller considers three propulsion control processes: charge depletion (CD), DDC, and CDC, wherein when SOC is greater than an upper boundary of SOC management, the supervisory controller directs operation under a CD mode, wherein after the SOC drops below the upper boundary, the supervisory controller directs operation in a CS mode, and wherein the supervisory controller switches between DDC and CDC each time a specified value of the upper boundary of SOC and a lower boundary of SOC are reached to facilitate reliable battery operation.

6. The system of claim 5, the CD mode includes motor propulsion only and regenerative braking modes, and wherein the CD mode includes running the motor at an optimal efficiency based on a predetermined database module for propelling the vehicle or regenerative braking, wherein optimal transmission gear maps that include optimal transmission gear selection maps, stored in memory, are used for an identified optimal motor propulsion and regenerative braking operating characteristics.

7. The system of claim 5, wherein the supervisory controller is configured to enable an engine charging mode with optimal operation efficiency at parking to stop if SOC is below a setting level such that the engine power source runs at an operational condition with maximal efficiency.

8. A method for controlling a parallel hybrid powertrain of a vehicle, the parallel hybrid powertrain including a CD mode and a CS mode including DDC operational control and CDC operational control to manage an engine-driven powertrain and a motor-driven powertrain and the combined engine and motor powertrain, the method comprising:

storing engine-driven powertrain operation information on predetermined optimal operating parameters for separate operation of the engine-driven powertrain consisting of a final drive, a transmission, and the engine power source;

storing motor-driven powertrain operation information on predetermined optimal operating parameters for separate operation of the motor-driven powertrain consisting of the final drive, the transmission, the electric motor power source, battery, and the engine power source for battery charging;

storing the combined engine and motor powertrain operation information on predetermined optimal operating parameters for concurrent operation of the engine, motor, final drive, the transmission, battery, and the engine power source for battery charging;

receiving instantaneous drive cycle data for the vehicle;

calculating tractive power and wheel torque based on the received drive cycle data;

determining, based at least in part on the calculated tractive power, the calculated wheel torque, the engine-driven powertrain operation information, the motor-driven powertrain operation information, the combined engine and motor powertrain information, and current and historical battery state of charge, wherein CD mode, DDC operational control and CDC operational control are determined to optimize a power operation to be performed by the engine-driven powertrain and motor-driven powertrain and combined engine and motor powertrain to maximize efficiency of the parallel hybrid powertrain of the vehicle;

wherein said determining includes:
  calculating battery state of charge, tractive power, wheel torque, and speed, based on the received drive cycle data;
  identifying a control strategy for operation, the control strategy based on one of the CD mode and the CS mode, wherein the DDC operational control and the CDC operational control are considered in the CS mode;
  identifying optimal engine operating characteristics and motor operating characteristics;
  identifying corresponding transmission operations, stored in a database module, for the identified optimal engine-driven powertrain operating characteristics and optimal motor-driven powertrain operating characteristics and optimal combined engine and motor operating characteristics;
  selectively controlling instantaneous operation of the engine-driven powertrain and the motor-driven powertrain and the combined engine and motor powertrain based on the identified optimal engine-driven powertrain operating characteristics and motor-driven powertrain operating characteristics and combined engine and motor powertrain operating characteristics and the calculated tractive power, wheel torque, and speed;

modulating the instantaneous operation of the engine-driven powertrain and the motor-driven powertrain and the combined engine and motor powertrain to smoothen operation of the parallel hybrid powertrain of the vehicle; and adjusting instantaneous operation of at least one of the engine-driven powertrain and motor-driven powertrain and the combined engine and motor powertrain based on analysis of real- time traffic data and a current segment or route planned for the vehicle.

9. The method of claim 8, wherein the engine-driven powertrain includes a final drive, a transmission, and an engine power source, and wherein the motor-driven powertrain includes a final drive, a transmission, an electric motor power source, a battery, and an engine power source for battery charging and wherein the combined engine and motor powertrain includes an engine, motor, final drive, transmission, battery, and the engine power source for battery charging.

10. The method of claim 8, wherein the engine-driven powertrain operation information, motor-driven powertrain operation information, and combined engine and motor powertrain information are stored in a database.

11. The method of claim 8, wherein:
the engine-driven powertrain includes a final drive, a transmission, and an engine power source;
the motor-driven powertrain includes a final drive, a transmission, an electric motor power source, a battery, and an engine power source for battery charging;
the engine-driven powertrain operating characteristics are operating characteristics of the final drive, transmission and engine; and
the motor-driven powertrain operating characteristics are operating characteristics of the final drive, transmission, electric motor power source, battery, and engine power source for battery charging.

12. A powertrain control system for a parallel hybrid powertrain of a vehicle, the parallel hybrid powertrain including a CD mode and a CS mode with DDC operational control and CDC operational control to manage an engine-driven powertrain and a motor-driven powertrain and a combined engine and motor powertrain, said powertrain control system comprising:

memory operable to store engine-driven powertrain information, a motor-driven powertrain information, and concurrent power source information, the engine-driven powertrain information pertaining to predetermined optimal operating parameters for separate operation of the engine-driven powertrain, the motor-driven powertrain information pertaining to predetermined optimal operating parameters for separate operation of the motor-driven powertrain, the concurrent engine and motor powertrain information pertaining to predetermined optimal operating parameters for concurrent engine and motor powertrain operation; and a controller operably coupled to the memory, the controller configured to:
receive instantaneous drive cycle data for the vehicle, the controller configured to calculate battery SOC, tractive power, and wheel torque based on the received drive cycle data;
determine a control strategy for operation, the control strategy based on one of CD mode and CS mode, wherein the DDC operational control and the CDC operational control are considered in CS mode;
determine a power operation between the engine-driven powertrain and motor-driven powertrain and combined engine and motor powertrain to maximize efficiency of the parallel hybrid powertrain of the vehicle;
determine the power operation based at least in part on the calculated tractive power, the calculated wheel torque, the engine-driven powertrain information, the motor-driven powertrain information, and the concurrent engine and motor powertrain information;
calculate engine/motor speed based on the received drive cycle data;
identify optimal engine operating characteristics and motor operating characteristics and concurrent engine and motor characteristics;
identify corresponding transmission operations, stored in memory, for the identified optimal engine operating characteristics and motor operating characteristics and concurrent engine and motor characteristics;
selectively control instantaneous operation of the engine-driven power train and the motor-driven power train and the_concurrent engine and motor based on the identified optimal engine operating characteristics and motor operating characteristics and_concurrent engine and motor characteristics and the calculated tractive power, wheel torque, and speed;
modulate instantaneous operation of the engine-driven powertrain and the motor-driven powertrain and concurrent engine and motor powertrain to smoothen operation of the parallel hybrid powertrain of the vehicle;
adjust instantaneous operation of at least one of the engine-driven powertrain and motor-driven powertrain and concurrent engine and motor powertrain based on analysis of real-time traffic data and a current segment or route planned for the vehicle;
identify optimal engine operating characteristics and motor operating characteristics and concurrent engine and motor characteristics, and corresponding transmission operations;
monitor a state of charge for a battery system of the motor-driven powertrain; and
determine whether the parallel hybrid powertrain of the vehicle is to be operated in battery charge depletion mode or battery charge sustaining mode; and
if it is the battery charge depletion mode, determine optimal motor-driven powertrain torque and corresponding speed via interpolation of data stored in the memory relating to the motor operating characteristics, or
if it is the battery charge sustaining mode, then determine optimal engine-driven powertrain torque and corresponding speed using data stored in the memory relating to the engine operating characteristics.

13. The powertrain control system of claim 12, wherein the vehicle is a hybrid vehicle.

14. The powertrain control system of claim 13, wherein the hybrid vehicle is a plug-in hybrid vehicle.

15. The powertrain control system of claim 12, wherein the vehicle is a bus.

16. The powertrain control system of claim 15, wherein an engine power source of the engine-driven power train comprises a natural gas engine or a diesel engine or a renewable fuel engine.

17. The powertrain control system of claim 12, wherein the engine-driven powertrain includes a final drive, a transmission and an engine, and wherein the motor-driven powertrain includes a final drive, a transmission, an electric motor power source, a battery, and an engine power source for battery charging, and wherein the combined engine and motor powertrain includes the engine, motor, final drive, transmission, battery, and the engine power source for battery charging.

18. The powertrain control system of claim 12, wherein the controller is configured to, when the parallel hybrid powertrain of the vehicle is to be operated in battery charge sustaining mode, activate the engine-driven powertrain:
- in an engine-driven powertrain propulsion mode and a simultaneous battery-charge mode, to charge the battery system, when the state of charge of the battery system reaches a lower limit, while power of an engine power source of the engine-driven power train is at its peak efficiency; or
- in an engine-only propulsion mode, while power demands of the engine power source are higher than the power of the engine power source at its peak efficiency.

19. The powertrain control system of claim 12, wherein the controller is incorporated into an eco-drive system, whereby the controller and the eco-drive system are operable to enhance operating efficiency of the vehicle.

* * * * *